(12) United States Patent
Yabe

(10) Patent No.: US 10,587,768 B2
(45) Date of Patent: Mar. 10, 2020

(54) CLIENT APPARATUS AND METHOD

(71) Applicant: CANON KABUSHIKI KAISHA, Tokyo (JP)

(72) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/108,790

(22) Filed: Aug. 22, 2018

(65) Prior Publication Data

US 2019/0068818 A1 Feb. 28, 2019

(30) Foreign Application Priority Data

Aug. 25, 2017 (JP) .................. 2017-162176

(51) Int. Cl.
*H04N 1/00* (2006.01)
*G06F 3/12* (2006.01)
*G06K 15/00* (2006.01)

(52) U.S. Cl.
CPC ....... *H04N 1/00896* (2013.01); *G06F 3/1221* (2013.01); *G06F 3/1232* (2013.01); *G06K 15/4055* (2013.01); *H04N 1/00087* (2013.01); *H04N 1/00244* (2013.01); *H04N 1/00885* (2013.01)

(58) Field of Classification Search
CPC .............. G06F 3/1221; H04N 1/00885; H04N 1/00896; G06K 15/4055
See application file for complete search history.

(56) References Cited

U.S. PATENT DOCUMENTS

| | | | |
|---|---|---|---|
| 8,228,524 B2* | 7/2012 | Sugishita | G03G 15/5004 358/1.14 |
| 2009/0013064 A1* | 1/2009 | Taylor | H04L 41/046 709/223 |
| 2009/0172117 A1* | 7/2009 | Bedi | H04W 52/0216 709/206 |
| 2009/0300070 A1* | 12/2009 | Kawajiri | G06F 1/3209 |
| 2010/0262691 A1* | 10/2010 | Shouno | H04L 69/28 709/224 |
| 2012/0042065 A1* | 2/2012 | Takahashi | G06F 3/1203 709/224 |
| 2012/0075651 A1* | 3/2012 | Sasase | G06F 1/3209 358/1.13 |
| 2013/0083338 A1* | 4/2013 | Fahrenkrug | G06F 3/1221 358/1.13 |

(Continued)

FOREIGN PATENT DOCUMENTS

JP 2014-021678 A 2/2014

*Primary Examiner* — Ted W Barnes
(74) *Attorney, Agent, or Firm* — Canon U.S.A.Inc., IP Division

(57) ABSTRACT

A client apparatus that communicates with a management server to receive an instruction from the management server, and a power supply of the client apparatus transitions to a sleep state when the client apparatus does not receive a user operation for a certain time period, and after the power supply of the client apparatus transitions to the sleep state, the power supply of the client apparatus temporarily transitions to a normal state without receiving a user operation. After the client apparatus communicates with the management server, the power supply of the client apparatus transitions from the normal state to the sleep state.

14 Claims, 17 Drawing Sheets

(56) References Cited

U.S. PATENT DOCUMENTS

| | | | |
|---|---|---|---|
| 2014/0092418 A1* | 4/2014 | Kishimoto | H04N 1/00896 358/1.14 |
| 2015/0098103 A1* | 4/2015 | Ebi | G06K 15/02 358/1.13 |
| 2016/0337541 A1* | 11/2016 | Morizumi | H04N 1/00904 |
| 2017/0013153 A1* | 1/2017 | Shin | H04W 76/10 |
| 2017/0041488 A1* | 2/2017 | Shibata | H04N 1/00344 |
| 2018/0069979 A1* | 3/2018 | Ito | H04N 1/00891 |
| 2018/0101144 A1* | 4/2018 | Fuger | B41M 3/00 |
| 2018/0159752 A1* | 6/2018 | Fratini | H04W 24/10 |
| 2018/0234570 A1* | 8/2018 | Yamaguchi | H04N 1/00896 |
| 2019/0034132 A1* | 1/2019 | Yamada | G06F 3/1207 |
| 2019/0034140 A1* | 1/2019 | Yamada | G06F 3/1259 |
| 2019/0042167 A1* | 2/2019 | Yamada | G06F 3/1207 |
| 2019/0042170 A1* | 2/2019 | Yamada | G06F 3/1259 |

* cited by examiner

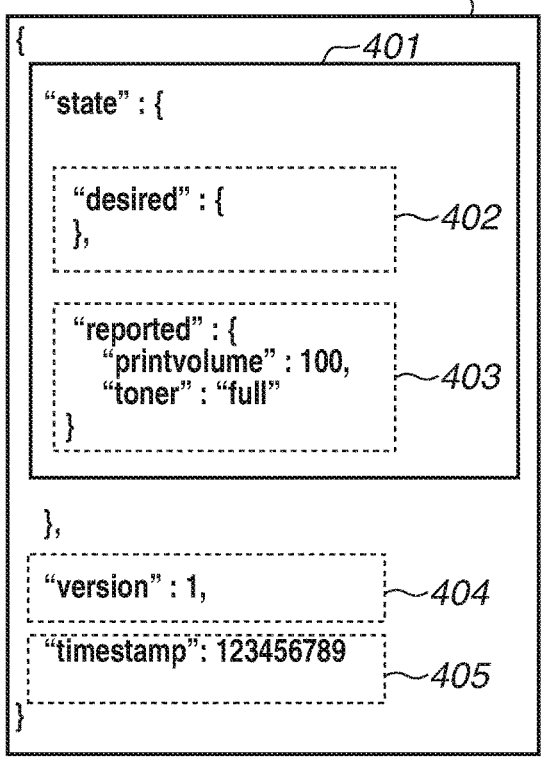
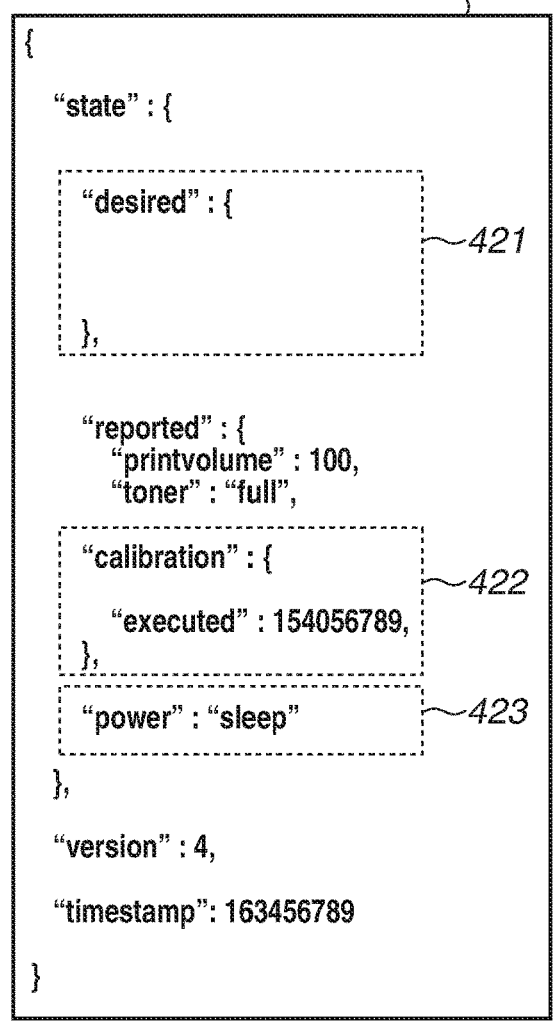
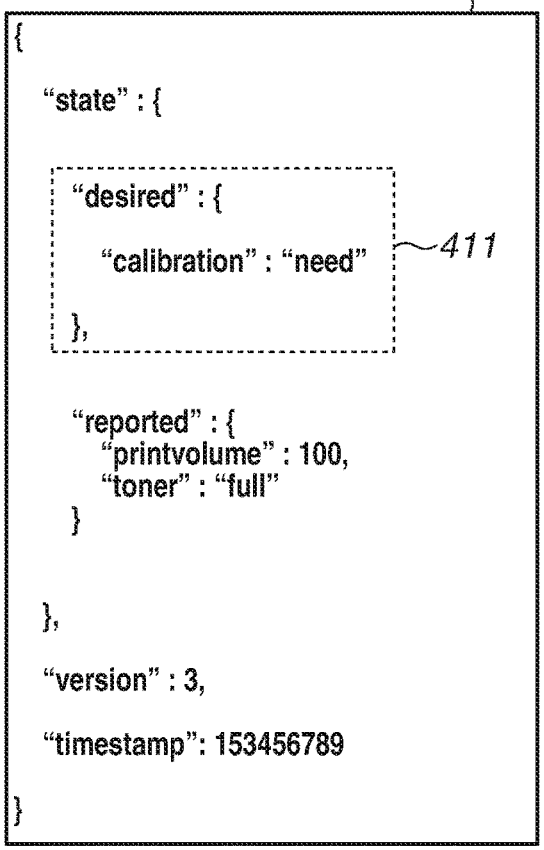

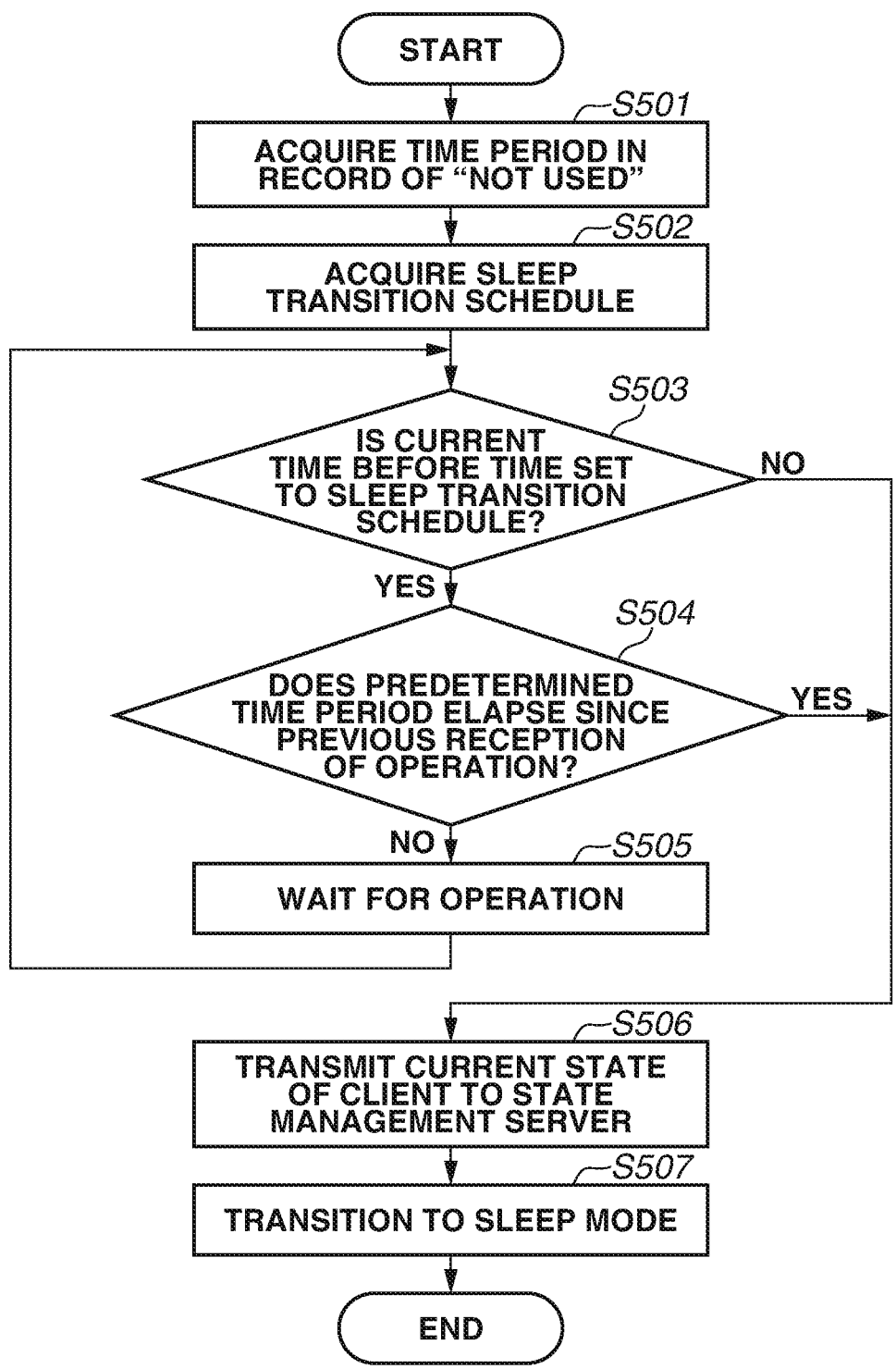

```
{
  "state" : {
    "desired" : {
    },
    "reported" : {
       "printvolume" : 100,
       "toner" : "full",
       "power" : "sleep"       601
    }
  },
  "version" : 2,
  "timestamp": 123452157
}
```

```
{
  "state" : {
    "desired" : {
    },
    "reported" : {
       "printvolume" : 100,
       "toner" : "full",
       "power" : "standby"     611
    }
  },
  "version" : 3,
  "timestamp": 143452157
}
```

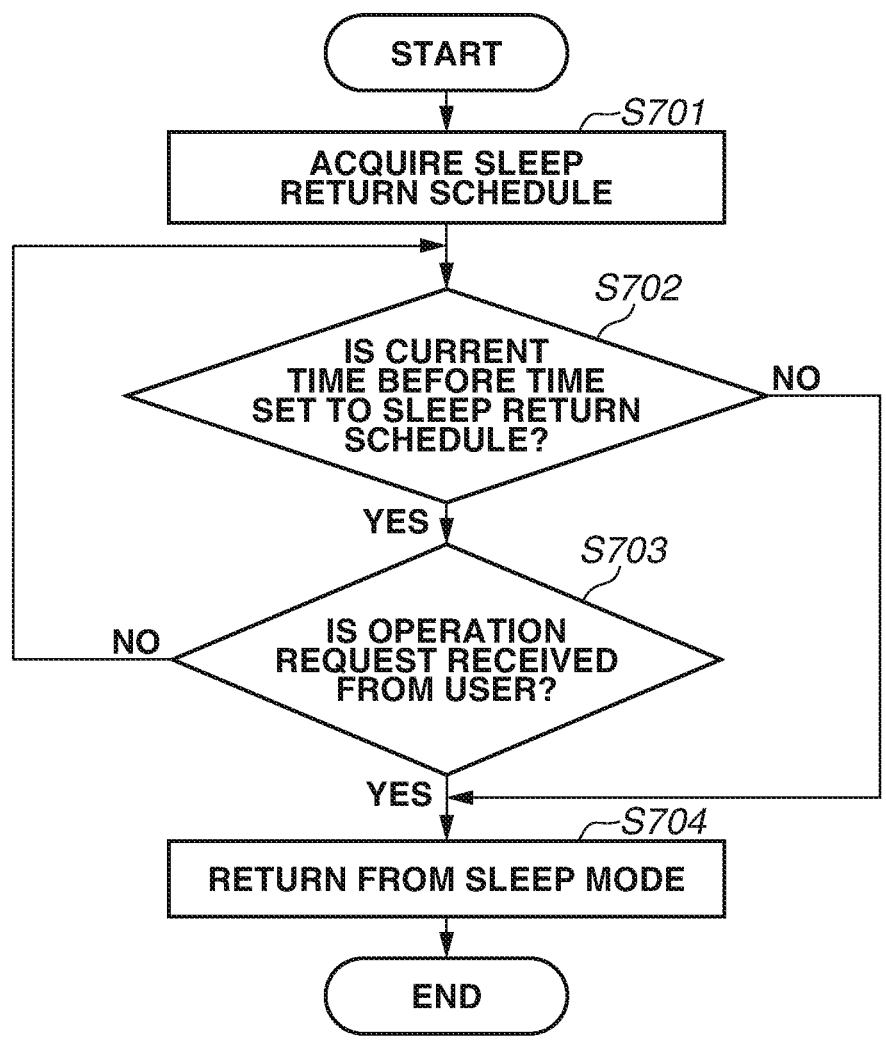

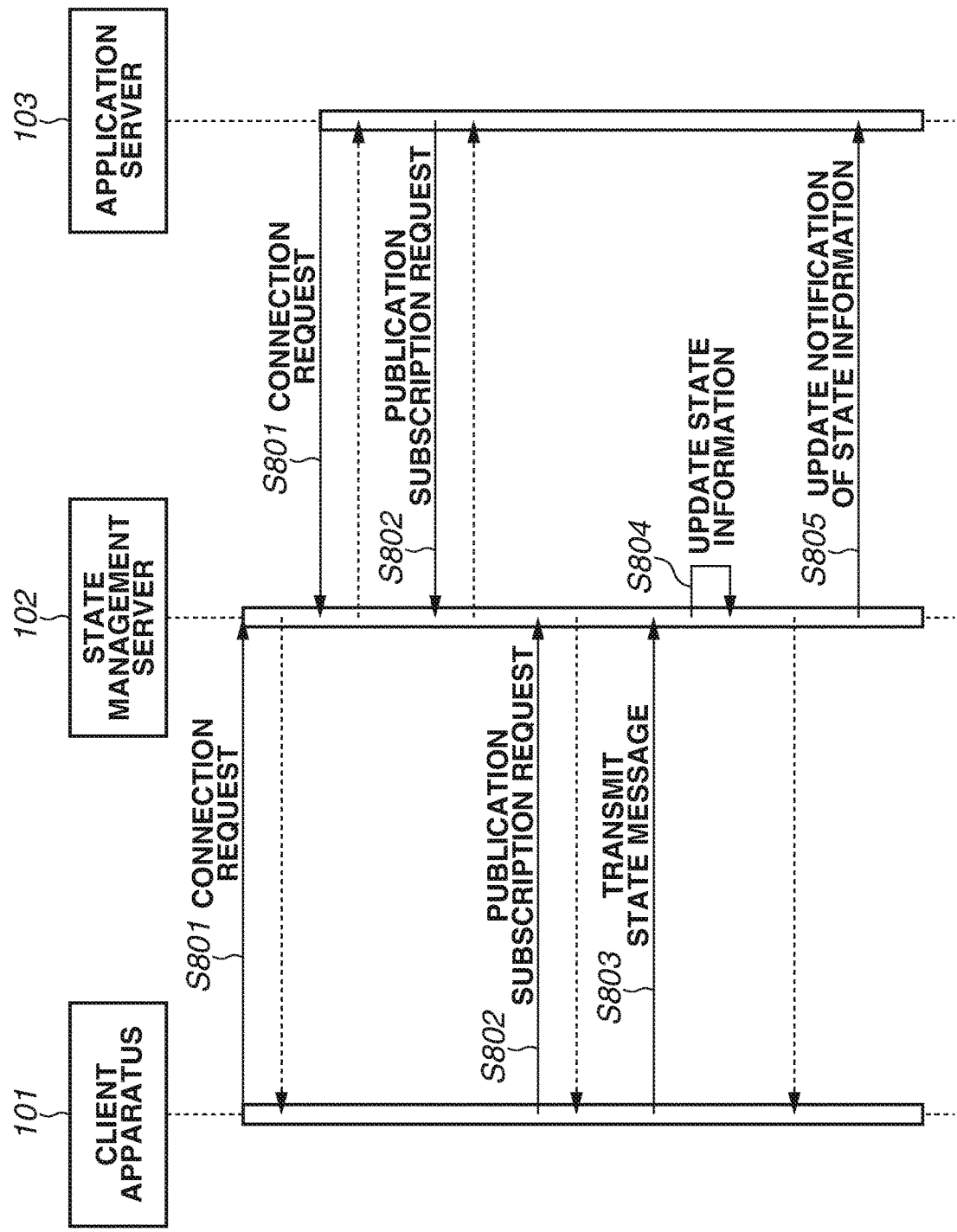

FIG.15A

```
{
  "state" : {
    "desired" : {
      "calibration" :                    1501
      {                1502      1503
        "priority" : "need",
        "userinfluence" : "notavailable"
      }
    },
    "reported" : {
      "printvolume" : 100,
      "toner" : "full"
    }
  },
  "version" : 3,
  "timestamp" : 153456789
}
```

```
{
  "state" : {
    "desired" : {
      "deviceclocksetting" :             1511
      {                1512      1513
        "priority" : "normal",
        "userinfluence" : "available"
      }
    },
    "reported" : {
      "printvolume" : 100,
      "toner" : "full"
    }
  },
  "version" : 3,
  "timestamp" : 153456789
}
```

1510

CLIENT APPARATUS AND METHOD

BACKGROUND OF THE INVENTION

Field of the Invention

The present disclosure relates to a client apparatus and a method capable of receiving an instruction from a management server.

Description of the Related Art

In recent years, a system for achieving the "Internet of Things" (hereinafter referred to as "IoT") for connecting to the Internet using an object, such as a household electrical appliance or an automobile, as a client has been increasingly used.

Further, an image forming apparatus has become multifunctional, and a multifunction apparatus termed a multifunction printer (hereinafter referred to as an "MFP") can also act as an IoT client. In the IoT, it is assumed that a great number of IoT clients are connected to a system. The IoT system collects and analyzes an enormous amount of information from the IoT clients, thereby providing added values for the IoT clients and users using the IoT clients. For example, a device management service as an IoT system to which multifunction peripherals are connected monitors the use state of users in real time and thereby can accurately predict the replacement timing of a consumable product such as a toner cartridge or a print sheet. Further, the device management service can instruct a device to execute the adjustment (hereinafter referred to as "calibration") of print quality that deteriorates due to the continuation of printing for a certain period.

For example, an AWS IoT, which is a service provided by Amazon Web Services (hereinafter referred to as "AWS"), has a function in which a service termed Device Shadow and an IoT client share the state of a client in real time. Using this function, the service can monitor the state of the client in real time, analyze information collected from the client, and distribute a necessary instruction to the client.

An IoT system is based on the premise that IoT clients are always connected to a service. Meanwhile, an MFP has a function of entering a hibernation status in a case where the MFP is not used for a certain time period, or in a time period in which it is expected in advance that the MFP will not be used, such as nighttime or outside business hours. This function is termed a "sleep mode". This enables the MFP to reduce power consumption. The MFP in the sleep mode is disconnected from the Internet, and therefore cannot receive or execute an instruction distributed from a service.

Japanese Patent Application Laid-Open No. 2014-021678 does not assume the IoT system as described above, but discusses the following technique. In a case where a setting is made so as to perform a periodical update after a shutdown process, before transitioning to a sleep state, an information processing apparatus sets an alarm to a return time for the update.

The above-described IoT system is characterized in that a management server for giving an instruction to a client apparatus in the system and managing state information of the client apparatus and the client apparatus communicate with each other in real time via the Internet. The client apparatus in a sleep state cannot communicate with the management server because the session between the management server and the client apparatus is disconnected. Thus, the client apparatus cannot receive an instruction from the system.

In Japanese Patent Application Laid-Open No. 2014-021678, before transitioning to the sleep state, the information processing apparatus receives from an external server an instruction regarding processing to be executed by the information processing apparatus after transitioning to the sleep state.

Accordingly, even if the information processing apparatus transitions to the sleep state, the information processing apparatus can execute an instruction received from a service while the information processing apparatus is in a standby state. However, the information processing apparatus cannot receive an instruction distributed from the service after the information processing apparatus transitions to the sleep mode.

SUMMARY OF THE INVENTION

According to an aspect of the present disclosure, a client apparatus configured to cause a state of the client apparatus to transition from a normal state to a sleep state when the client apparatus does not receive a user operation for a certain time period, includes a memory storing instructions, and a processor executing the instructions causing the client apparatus to perform control so that, in a case where the state of the client apparatus transitions from the sleep state to the normal state by receiving a user operation, communication with a management server for managing an instruction to the client apparatus without a request from the client apparatus is started according to a first communication method allowing the client apparatus to receive an instruction from the management server, to communicate with the management server to acquire an instruction from the management server in a case where the state of the client apparatus temporarily transitions from the sleep state to the normal state without the client apparatus receiving a user operation, and to perform control so that after the communication is performed when the client apparatus is temporarily in the normal state, the state of the client apparatus transitions from the normal state to the sleep state.

Further features of the present disclosure will become apparent from the following description of exemplary embodiments with reference to the attached drawings.

BRIEF DESCRIPTION OF THE DRAWINGS

FIGS. 4A, 4B, and 4C are diagrams illustrating examples of a state change instruction message.

FIG. 5 is a flowchart illustrating processing when a client apparatus transitions to a sleep mode.

FIGS. 6A and 6B are diagrams illustrating examples of a state message transmitted from the client apparatus to a state management server 102 when the client apparatus transitions to a sleep mode.

FIG. 7 is a flowchart illustrating processing when the client apparatus returns from a sleep mode.

FIG. 8 is a sequence diagram illustrating processing of transmitting and receiving a state change instruction message based on a publication subscription model via the state management server 102.

FIGS. 15A and 15B are diagrams illustrating examples of the state change instruction message received by the client apparatus 101 in FIG. 14.

DESCRIPTION OF THE EMBODIMENTS

Exemplary embodiments for implementing the present disclosure will be described below with reference to the drawings.

Figure 1:
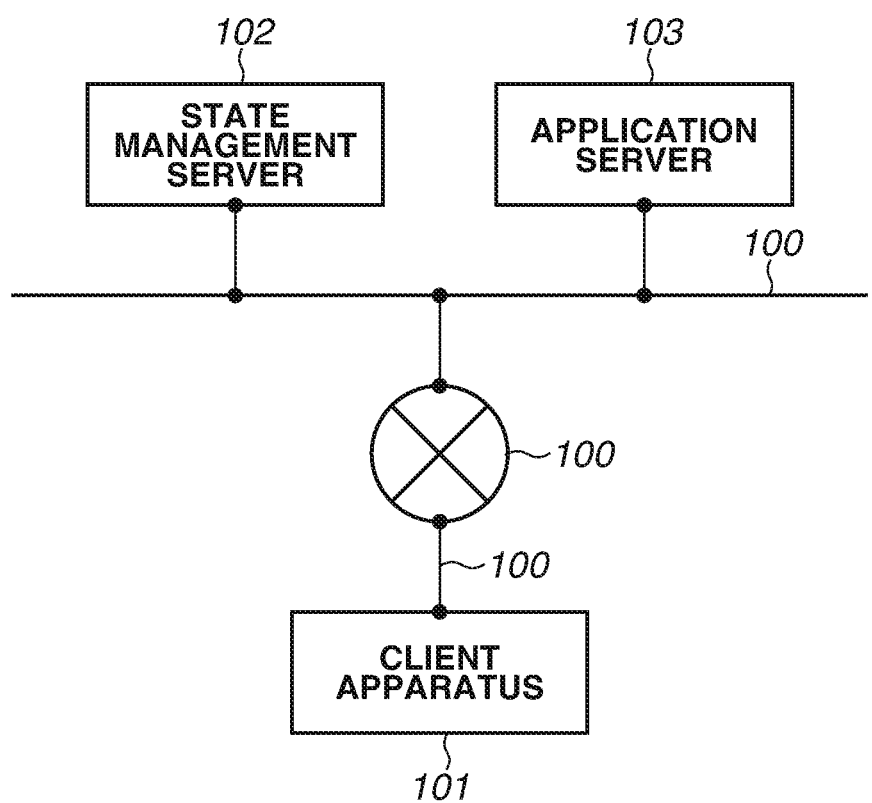
FIG. 1 is a block diagram illustrating an example of an entire system.

FIG. 1 is a block diagram illustrating an example of an overall configuration of a system according to a first exemplary embodiment.

A network 100 is a network for connecting a client apparatus 101, a state management server 102, and an application server 103, The network 100 is an infrastructure for performing communications between these components, and may be a wide area network (WAN) or a local area network (LAN).

The client apparatus 101 is connected to the state management server 102 and the application server 103 via the network 100. In the present exemplary embodiment, the client apparatus 101 is described using a multifunction printer (MFP) as an example. The client apparatus 101, however, may be an apparatus other than the MFP so long as the apparatus has the function of communicating via the network 100, and the state of the apparatus transitions to a sleep mode according to the usage state of the apparatus. The "sleep mode" refers to a sleep state where, to reduce power consumption of the client apparatus 101, functions other than some functions cannot be used, and the client apparatus 101 is not connected to the network 100. On the other hand, a "standby mode" refers to a normal state where the client apparatus 101 is connected to the network 100, and a user can use the client apparatus 101. Further, although FIG. 1 illustrates a single client apparatus 101 connected to the network 100, a plurality of client apparatuses 101 may be connected to the network 100. In other words, it is possible to employ the configuration in which one or more client apparatuses 101 are connected to the state management server 102 and the application server 103 via the network 100.

The state management server 102 is a server for managing the state of the client apparatus 101. When the state of the client apparatus 101 changes, the client apparatus 101 transmits the value of the change to the state management server 102. Further, the application server 103 monitors the state of the client apparatus 101 via the state management server 102 and transmits, to the state management server 102, an instruction according to the change in the state. The state management server 102 transmits the instruction from the application server 103 to the client apparatus 101.

The application server 103 is a server for monitoring the state of the client apparatus 101 via the state management server 102 and generates an instruction to the client apparatus 101 according to a change in the state.

Figure 2:
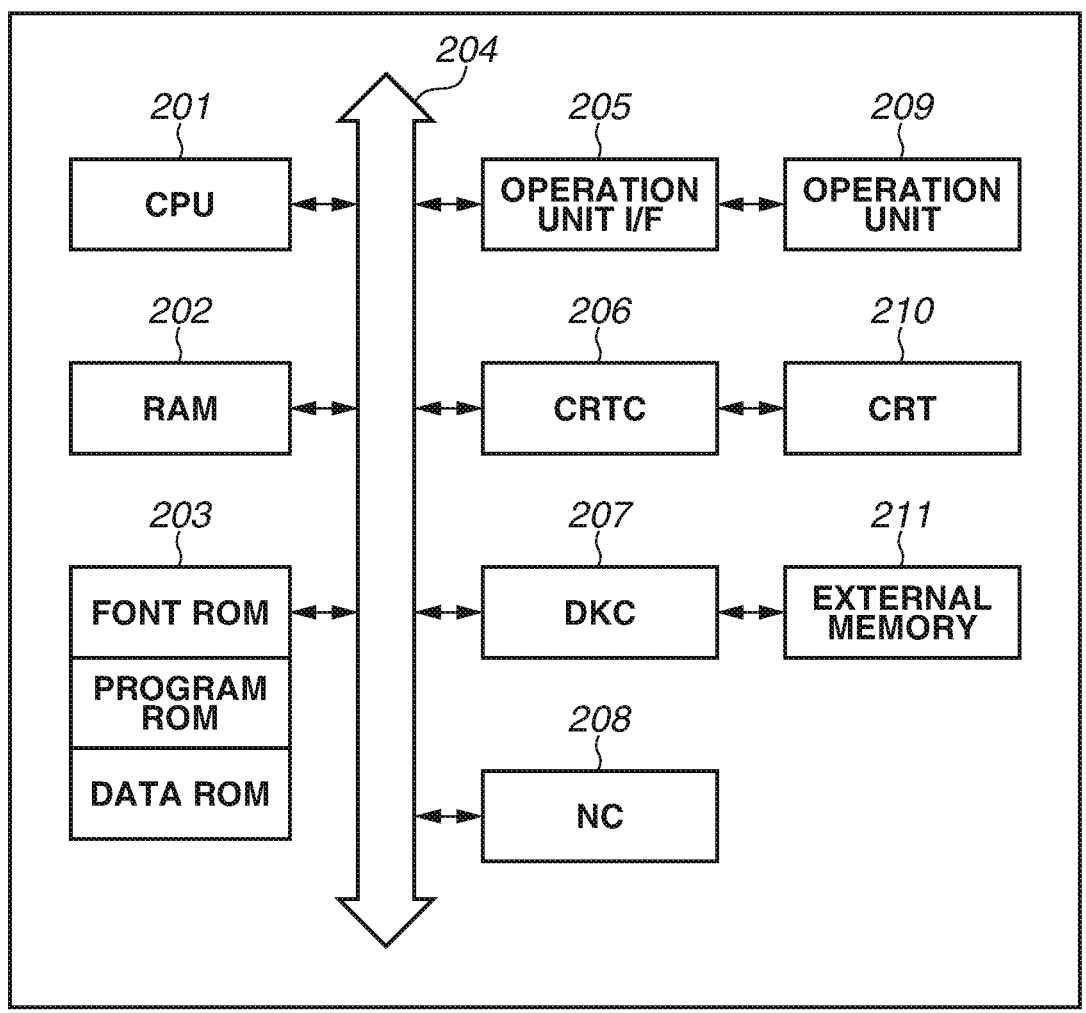
FIG. 2 is a block diagram illustrating an example of a hardware configuration.

FIG. 2 is a block diagram illustrating an example of a hardware configuration of an information processing apparatus. The information processing apparatus according to the present exemplary embodiment is each of the client apparatus 101 and server computers in a data center. The functions of the state management server 102 and the application server 103 are achieved by virtual machines constructed on the server computers. The virtual machines are logical computers achieved as follows by virtualization technology. Specifically, a server is divided into logical units, regardless of the physical configuration of the server, and the divided logical units operate with independent operating systems.

A central processing unit (CPU) 201 executes programs including an operating system (OS) and an application stored in a program read-only memory (ROM) of a ROM 203 or loaded from an external memory 211 such as a hard disk into a random-access memory (RAM) 202. Further, the CPU 201 controls blocks connected to a system bus 204. The processing of each sequence described below can be achieved by executing these programs.

The RAM 202 functions as a main memory and a work area for the CPU 201. An operation unit interface (I/F) 205 controls an input from an operation unit 209. A cathode ray tube controller (CRTC) 206 controls the display of a CRT display.

A disk controller (DKC) 207 controls data access in the external memory 211 such as a hard disk for storing various types of data. A network controller (NC) 208 executes a communication control process with the server computers or another device connected to the information processing apparatus via the network 100.

In the processing of flowcharts described below, the CPU 201 performs processing as hardware, and an application program installed on the external memory 211 performs processing as software, unless otherwise noted.

Figure 3:
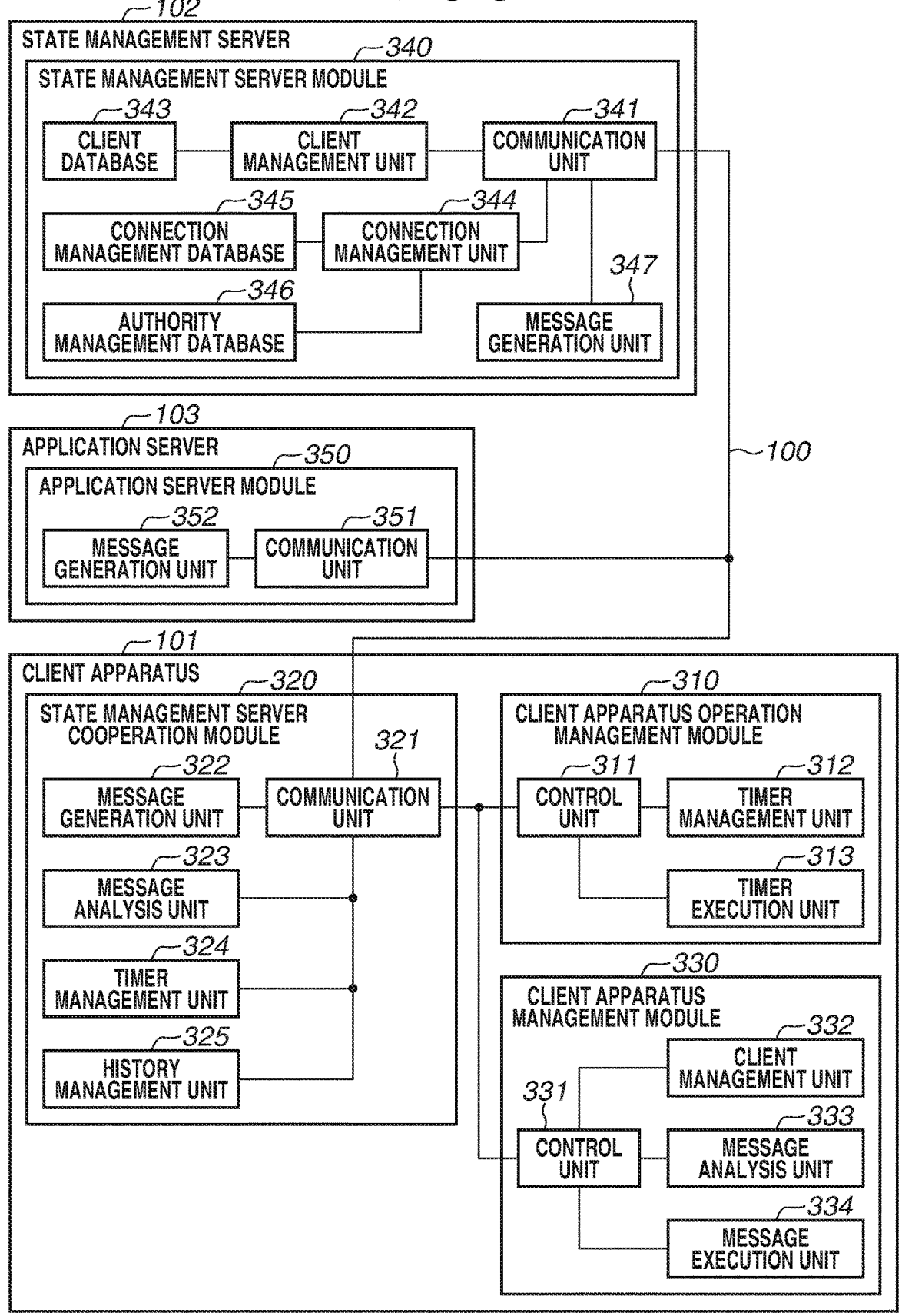
FIG. 3 is a block diagram illustrating an example of a software configuration.

FIG. 3 is a block diagram illustrating software module configurations of the components included in the system. These software modules are stored in the external memories 211 of the components and executed by the CPUs 201 of the components.

First, the client apparatus 101 includes a client apparatus operation management module 310, a state management server cooperation module 320, and a client apparatus management module 330.

The client apparatus operation management module 310 (hereinafter referred to as the "module 310") is a module for managing an operation state of the client apparatus 101 and controls the transition of the client apparatus 101 from the normal state to the sleep state. The module 310 also controls the transition (return) of the client apparatus 101 from the sleep state to the normal state. The module 310 includes a control unit 311, a timer management unit 312, and a timer execution unit 313.

The control unit 311 controls the entire module 310. The control unit 311 instructs the components of the software module and manages the components. The timer management unit 312 manages timer information as the conditions under which the client apparatus 101 transitions to the sleep mode and returns from the sleep mode. Table 1 illustrates a timer information table as an example of the timer information managed by the timer management unit 312.

TABLE 1

Timer Information Table

| ID | Operation type | Condition |
|----|----------------|-----------|
| 1 | not used | 4 hours |
| 2 | scheduled transition | every day, 21 o'clock |
| 3 | scheduled return | every day, 8 o'clock |

An "ID" column is a column for storing an identifier for uniquely identifying timer information in the module 310.

An "operation type" column is a column for storing information for identifying an operation type when a timer is executed in the module 310. For example, if the value in the column is "not used" or "scheduled transition", this indicates that this record is timer information when the client apparatus 101 transitions to the sleep mode. Further, if the value in the column is "scheduled return", this indicates that this record is timer information when the client apparatus 101 returns from the sleep mode.

A "condition" column is a column for storing a condition value of the execution of the timer corresponding to the value in the "operation type" column in the module 310. In a case of a record where the value in the "operation type" column is "not used", the "condition" column stores a value specifying the time until the client apparatus 101 transitions to the sleep mode when the state where the client apparatus 101 is not used continues. For example, in a case of a record where the value in the "ID" column illustrated in table 1 is "1", this means that if the state where the client apparatus 101 is not used continues for four hours, the client apparatus 101 transitions to the sleep mode. Further, in a case of a record where the value in the "operation type" column is "scheduled transition", the "condition" column stores a value specifying a date and time when the client apparatus 101 periodically transitions to the sleep mode. For example, in a case of a record where the value in the "ID" column illustrated in table 1 is "2", this means that the client apparatus 101 transitions to the sleep mode at 21 o'clock every day. Further, in a case of a record where the value in the "operation type" column is "scheduled return", the "condition" column stores a value specifying a date and time when the client apparatus 101 periodically returns from the sleep mode. For example, in a case of a record where the value in the "ID" column illustrated in table 1 is "3", this means that the client apparatus 101 returns from the sleep mode at 8 o'clock every day.

Next, according to the timer information registered in the timer information table (table 1) of the timer management unit 312, the timer execution unit 313 causes the client apparatus 101 to transition to the sleep mode or return from the sleep mode. The module 310 is a module that continues to operate even after the client apparatus 101 transitions to the sleep mode.

Further, the state management server cooperation module 320 (hereinafter referred to as the "module 320") transmits state information of the client apparatus 101 to the state management server 102. Further, the module 320 receives a state change instruction generated by the application server 103 via the state management server 102. The module 320 includes a communication unit 321, a message generation unit 322, a message analysis unit 323, a timer management unit 324, and a history management unit 325.

The communication unit 321 communicates with the state management server 102 connected to the client apparatus 101 through the network 100 via the NC 208.

The message generation unit 322 generates a client state message using state information of the client apparatus 101 acquired from the client apparatus management module 330. The generated client state message is transmitted to the state management server 102 via the communication unit 321.

The message analysis unit 323 analyzes a state change instruction message received from the state management server 102 via the communication unit 321 and transmits the state change instruction message to the corresponding client apparatus management module 330. It is assumed that a plurality of client apparatus management modules 330 are provided.

The timer management unit 324 manages the interval at which the update of the state change instruction message is checked with respect to the state management server 102 while the client apparatus 101 is in the sleep mode. Table 2 illustrates a message check interval table as an example of the message check interval managed by the timer management unit 324.

TABLE 2

Message check interval Table

| ID | Check interval |
|----|----------------|
| 1 | 15 minutes |

An "ID" column is a column for storing an identifier for uniquely identifying a message check interval in the module 320.

A "check interval" column is a column for storing a value of the execution interval at which the module 320 checks the update of the state change instruction message with the state management server 102. Table 2 illustrates an example where the timer management unit 324 checks the update of the state change instruction message every 15 minutes while the client apparatus 101 is in the sleep mode.

Next, the history management unit 325 manages an execution history in a case where the corresponding client apparatus management module 330 executes processing based on the state change instruction message analyzed by the message analysis unit 323. Table 3 illustrates an execution history table as an example of the state change instruction message execution history managed by the history management unit 325.

TABLE 3

Execution History Table

| ID | Application name | Date and time information |
|---|---|---|
| 1 | calibration | 2017/06/01 21:45 |
| 2 | calibration | 2017/06/02 21:30 |
| 3 | calibration | 2017/06/03 21:00 |

An "ID" column is a column for storing an identifier for uniquely identifying an execution history in the module 320.

An "application name" column is a column for storing the name of the application server 103 as the generation source of the state change instruction message received from the state management server 102 by the message analysis unit 323 in the module 320.

A "date and time information" column is a column for storing date and time information regarding the date and time when the message generation unit 322 transmits a client state message as the execution result of the state change instruction message to the state management server 102. The state change instruction message is analyzed by the message analysis unit 323, and the corresponding client apparatus management module 330 executes processing based on the message.

Further, the client apparatus management module 330 (hereinafter referred to as the "module 330") is a module that reflects, on the client apparatus 101, a state change instruction message received by the message analysis unit 323, A plurality of modules 330 may be provided. The state change instruction message is generated by the application server 103 and transmitted to the message analysis unit 323 via the state management server 102. The module 330 includes a control unit 331, a client management unit 332, a message analysis unit 333, and a message execution unit 334.

The control unit 331 controls the entire module 330. The control unit 331 instructs the components of the software module and manages the components. The client management unit 332 manages various state values and setting values of the client apparatus 101. The message analysis unit 333 performs a detailed analysis of the state change instruction message received from the communication unit 321 and determines processing to be executed by the message execution unit 334.

According to the content analyzed by the message analysis unit 333, the message execution unit 334 changes the setting or the state of a corresponding module in the client apparatus 101. Further, if the processing is completed, the message execution unit 334 updates the various state values and setting values managed by the client management unit 332.

The state management server 102 includes a state management server module 340 (hereinafter referred to as a "module 340"). The module 340 manages the state of the client apparatus 101. If the state of the client apparatus 101 changes, the module 340 notifies the application server 103, with which the client apparatus 101 cooperates, of the change. Further, the module 340 receives from the application server 103 a state change instruction message to the client apparatus 101 and notifies the client apparatus 101 of the message, thereby instructing the client apparatus 101 to change the state. The module 340 includes a communication unit 341, a client management unit 342, a client database 343, a connection management unit 344, a connection management database 345, an authority management database 346, and a message generation unit 347.

The communication unit 341 communicates with the client apparatus 101 and the application server 103 connected to the state management server 102 through the network 100 via the NC 208.

The client management unit 342 manages state information of the client apparatus 101 connected to the state management server 102. The state information of the client apparatus 101 is stored in the client database 343. Table 4 illustrates a client apparatus state information table as an example of the state information of the client apparatus 101 stored in the client database 343 and managed by the client management unit 342.

TABLE 4

Client Apparatus State Information Table

| State information ID | State information name | State information |
|---|---|---|
| 1 | mfp1 | <state information file> |
| 2 | mfp2 | <state information file> |

A "state information ID" column is a column for managing an identifier for uniquely identifying the client apparatus 101 connected to the module 340.

A "state information name" column is a column for managing the name of the client apparatus 101 connected to the module 340.

A "state information" column is a column for managing the state information of the client apparatus 101 connected to the module 340. FIGS. 4A to 4C illustrate examples of the state information of the client apparatus 101 managed in the "state information" column.

FIGS. 4A to 4C are diagrams illustrating examples of the state information of the client apparatus 101 managed by the state management server 102.

A state information file 400 illustrated in FIG. 4A is a file for the state management server 102 to manage the state information of the client apparatus 101 and is present in association with the client apparatus 101 managed by the state management server 102. The state information file 400 includes a state information portion 401, an instruction portion 402, a state portion 403, a version 404, and a timestamp 405. In the present exemplary embodiment, the state information file 400 is described in a JavaScript® Object Notation format (hereinafter referred to as a "JSON format"), but the format of the state information file 400 is not limited to this format.

The state information portion 401 includes an instruction portion 402, which indicates an instruction from the application server 103, and the state portion 403, which indicates the current state of the client apparatus 101. In the instruction portion 402, the content of an instruction from the application server 103 is stored. The value of the state of the client apparatus 101 after being changed according to the instruction from the application server 103 is stored. If the value of the instruction portion 402 is null, this indicates that an instruction from the application server 103 is not present. In the state portion 403, the value of the current state of the client apparatus 101 is stored.

The version 404 indicates the version of the state information file 400. Every time the state information file 400 is updated by the client apparatus 101 and the application server 103, the value of the version 404 is changed. In the timestamp 405, when the state information file 400 is updated by the client apparatus 101 and the application server 103, timestamp information is stored. FIGS. 4B and 4C will be described below.

The description returns to FIG. 3. The connection management unit 344 manages connection information of the client apparatus 101 and the application server 103 connected to the state management server 102 via the network 100. The connection information of the client apparatus 101 and the application server 103 currently connected to the state management server 102 is stored in the connection management database 345. Table 5 illustrates a connection information table as an example of connection information of the state management server 102 stored in the connection management database 345 and managed by the connection management unit 344.

TABLE 5

Connection Information Table

| Connection ID | Connection client name | Publication state information name | Subscription state information name |
|---|---|---|---|
| con1 | mfp1 | mfp1 | mfp1 |
| con2 | mfp2 | mfp2 | mfp2 |
| con3 | appServer1 | mfp1, mfp2 | mfp1, mfp2 |
| con4 | appServer2 | mfp1 | |

A "connection ID" column is a column for storing an identifier for uniquely identifying the client apparatus 101 or the application server 103 currently connected to the state management server 102.

A "connection client name" column is a column for storing the name of the client apparatus 101 or the application server 103 currently connected to the state management server 102.

A "publication state information name" column is a column for storing the name of state information that can be updated.

A "subscription state information name" column is a column for storing the name of state information that can be referenced.

Next, authority information regarding state information of the client apparatus 101 accessible by the client apparatus 101 and the application server 103 connected to the state management server 102 is stored in an authority management database 346. Table 6 illustrates an authority information table as an example of the authority information regarding the state information stored in the authority management database 346 and managed by the connection management unit 344.

TABLE 6

Authority Information Table

| Connection client name | State information ID | State information name | Authority |
|---|---|---|---|
| mfp1 | 1 | mfp1 | Publish, Subscribe |
| mfp2 | 2 | mfp2 | Publish, Subscribe |
| appSever1 | 1 | mfp1 | Publish, Subscribe |
| appSever1 | 2 | mfp2 | Publish, Subscribe |
| appSever2 | 1 | mfp1 | Subscribe |

A "connection client name" column is a column for storing the names of the client apparatus 101 and the application server 103 the authority information of which is managed by the state management server 102. In the present exemplary embodiment, a record where the value in the "connection client name" column is "mfp1" or "mfp2" is the authority information of the client apparatus 101. Further, in the present exemplary embodiment, a record where the value in the "connection client name" column is "appServer1" or "appServer2" is the authority information of the application server 103.

A "state information ID" column is a column for storing an identifier for uniquely identifying state information accessible by the client apparatus 101 or the application server 103 corresponding to the value of the "connection client name" column.

A "state information name" column indicates state information accessible by the client apparatus 101 or the application server 103 indicated by a value in the "connection client name" column. The "state information name" column stores a client apparatus name indicating which client apparatus the state information corresponds to.

An "authority" column is a column for storing a value corresponding to authority to access the state information file 400 in the client apparatus state information table (table 4) corresponding to the value in the "state information ID" column. In the present exemplary embodiment, if the value is "Publish", this means that the client apparatus 101 or the application server 103 has authority to update the state information file 400. If the value is "Subscribe", this means that the client apparatus 101 or the application server 103 has authority to refer to the state information file 400. The example illustrated in the authority information table means that "mfp1" and "mfp2", which correspond to the client apparatus 101, each have authority to update and refer to the state information file 400 of "mfp1" or "mfp2" itself. Further, "appServer1", which corresponds to the application server 103, has authority to update and refer to the state information file 400 of each of "mfp1" and "mfp2". On the other hand, "appServer2", which corresponds to the application server 103, has only authority to refer to the state information file 400 of "mfp1". The message generation unit 347 generates a state change instruction message based on a state change instruction received from the application server 103. The generated state change instruction message is transmitted to the corresponding client apparatus 101 via the communication unit 341.

Further, the application server 103 includes an application server module 350 (hereinafter referred to as a "module" 350). According to information received from the client apparatus 101, if the module 350 determines that it is necessary to change the state of the client apparatus 101, the module 350 transmits via the state management server 102 a state change instruction to change the state of the client apparatus 101. The module 350 includes a communication unit 351 and a message generation unit 352. The information received by the application server 103 from the client apparatus 101 and the processing executed by the application server 103 using the received information are not particularly limited. Thus, the information and the processing are not described in the present exemplary embodiment.

The communication unit 351 communicates with the client apparatus 101 and the state management server 102 connected to the application server 103 on the network 100 via a network controller (NC) 208.

According to information received from the client apparatus 101, the message generation unit 352 generates a state change instruction message. The generated state change instruction message is transmitted to the state management server 102 via the communication unit 351.

FIGS. 5, 6, and 7 illustrate a series of processes from when the client apparatus 101 transitions to a sleep mode to when the client apparatus 101 returns from the sleep mode.

The client apparatus 101 has the function of, in a case where it is expected that the client apparatus 101 will not be used by a user for a certain time period, transitioning to a sleep mode according to a predetermined condition to save power. There are two conditions under which the client apparatus 101 transitions to the sleep mode.

One of the conditions is that it is understood in advance that the user does not use the client apparatus 101 during a fixed time period of the day, such as nighttime or outside business hours. In this case, time periods in which the client apparatus 101 transitions to and returns from the sleep mode are scheduled, and the client apparatus 101 changes its state according to the scheduled times.

The other condition is that the client apparatus 101 is not used by the user for a certain time period during a time period of the day in which it is not possible to predict when the client apparatus 101 will be used by the user, such as daytime or within business hours. In this case, to avoid waste caused by the client apparatus 101 continuing to operate even if the user does not use the client apparatus 101, a non-use continuation time is set for the client apparatus 101 so that if the state where the client apparatus 101 is not used continues for a certain time period, the client apparatus 101 transitions to the sleep mode. The client apparatus 101 monitors a use request from the user. Then, if the state where the client apparatus 101 does not receive a processing request from the user continues for the set time, the client apparatus 101 transitions to the sleep mode. If the client apparatus 101 having transitioned to the sleep mode receives a processing request from the user through an operation unit 209, the client apparatus 101 returns from the sleep mode.

FIG. 5 is a flowchart illustrating basic processing in which the client apparatus 101 transitions to the sleep mode. This processing is executed by a module 310 of the client apparatus 101. The processes of steps in the flowchart illustrated in FIG. 5 are achieved by a central processing unit (CPU) 201 of the client apparatus 101 reading a program recorded in a read-only memory (ROM) 203 or an external memory 211 and executing the program.

In step S501, a control unit 311 acquires a time indicated by the value in a "condition" column in a record where the value in an "operation type" column is "not used" in a timer information table (table 1) of a timer management unit 312.

In step S502, the control unit 311 acquires the value in the "condition" column in a record where the value in the "operation type" column is "scheduled transition" in the timer information table (table 1) of the timer management unit 312.

In step S503, the control unit 311 compares the current time with the scheduled transition time acquired in step S502 and stored in the "condition" column. If the current time is before the scheduled transition time (YES in step S503), the processing proceeds to step S504. If the current time matches or is after the scheduled transition time (NO in step S503), the processing proceeds to step S506.

In step S504, the control unit 311 checks whether the client apparatus 101 is not used for the certain time acquired in step S501. If the time period during which the client apparatus 101 is not used does not reach the certain time stored in the "condition" column in the record with "not used" (NO in step S504), the processing proceeds to step S505. If the time period during which the client apparatus 101 is not used reaches the certain time (YES in step S504), the processing proceeds to step S506.

In step S505, the control unit 311 waits for an operation from the user and executes the process of step S503 again.

In step S506, a message generation unit 322 generates a client state message 600 indicating that the client apparatus 101 is to transition to the sleep mode. Then, the message generation unit 322 transmits the client state message 600 to the state management server 102 via the communication unit 321. Using the received client state message 600 at the time of transition to the sleep mode, the client management unit 342 of the state management server 102 updates the corresponding state information file 400 in state information managed in the client apparatus state information table.

FIG. 6A is a diagram illustrating an example of the client state message 600 transmitted from the client apparatus 101 to the state management server 102 when the client apparatus 101 transitions to the sleep mode.

Components of the client state message 600 at the time of transition to the sleep mode are similar to those of the state information file 400, and therefore are not described here. Only the differences when the client apparatus 101 transitions to the sleep mode are described. A state portion 601 is information indicating the power supply state of the client apparatus 101 when the client apparatus 101 transitions to the sleep mode.

FIG. 6B is a diagram illustrating an example of a client state message 610 transmitted from the client apparatus 101 to the state management server 102 when the client apparatus 101 returns from the sleep mode.

Components of the client state message 610 at the time of return from sleep are similar to those of the state information file 400, and therefore are not described here. Only the differences when the client apparatus 101 returns from the sleep mode are described. A state portion 611 is information indicating the power supply state of the client apparatus 101 when the client apparatus 101 returns from the sleep mode.

Returning back to FIG. 5, in step S507, the control unit 311 causes the client apparatus 101 to transition to the sleep mode via a timer execution unit 313.

FIG. 7 is a flowchart illustrating basic processing in which the client apparatus 101 returns from the sleep mode. This processing is executed by the module 310 of the client apparatus 101.

In step S701, the control unit 311 acquires the value in the "condition" column in a record where the value in the "operation type" column is "scheduled return" in the timer information table (table 1) of the timer management unit 312.

In step S702, the control unit 311 compares the current time with the scheduled return time acquired in step S502 and stored in the "condition" column in the record where the value of the "operation type" column is "scheduled return". If the current time is before the scheduled return time (YES in step S702), the processing proceeds to step S703. If the current time matches or is after the scheduled return time (NO in step S702), the processing proceeds to step S704.

In step S703, the control unit 311 determines whether an operation request is received from the user. If an operation request is received from the user (YES in step S703), the processing proceeds to step S704. If an operation request is not received from the user (NO in step S703), the control unit 311 executes the process of step S702 again.

In step S704, the message generation unit 322 generates the client state message 610 indicating that the client apparatus 101 is to return from the sleep mode. Then, the message generation unit 322 transmits the client state message 610 to the state management server 102 via the communication unit 321. Using the received client state message 610, the client management unit 342 of the state management server 102 updates the corresponding state information file 400 in the state information managed in the client apparatus state information table. The control unit 311 causes the client apparatus 101 to return from the sleep mode via the timer execution unit 313.

FIG. 8 is a sequence diagram illustrating a series of processes in which the client apparatus 101 and the application server 103 receive an update notification of state information managed by the state management server 102.

If state information such as a hardware setting or a software setting of the client apparatus 101 is changed, the client apparatus 101 transmits the changed state information to the state management server 102. Upon receiving the state information from the client apparatus 101, the state management server 102 transfers the received information to the application server 103 relevant to the client apparatus 101.

Further, if the application server 103 is to change a hardware setting or a software setting of the client apparatus 101 relevant to the application server 103 or is to cause the client apparatus 101 to execute some processing, the application server 103 transmits state information to the state management server 102. Upon receiving the state information from the application server 103, the state management server 102 transfers the received information to the client apparatus 101 relevant to the application server 103.

A conventional communication method is achieved by the client apparatus 101 and the application server 103 directly connecting to each other. In such a case, however, the application server 103 needs to manage communication with all client apparatuses 101 relevant to the application server 103. A communication method using a publication subscription method (Message Queue Telemetry Transport (MQTT)) illustrated in FIG. 8 via the state management server 102 is employed, whereby it is possible to transmit and receive information in both directions in a state where the application server 103 does not bear the load of managing the client apparatus 101. Thus, the state management server 102 can instruct the client apparatus 101 without a request from the client apparatus 101.

In step S801, the client apparatus 101 transmits, to the state management server 102, a connection request to connect to state information. Further, in step S801, the application server 103 also transmits, to the state management server 102, a connection request to connect to the state information. Upon receiving the connection requests, the connection management unit 344 of the state management server 102 registers the client apparatus 101 and the application server 103 as the client names of the clients having transmitted the connection requests in the connection information table (table 5) in the connection management database 345.

In step S802, the client apparatus 101 transmits, to the state management server 102, a publication subscription request to refer to and update the state information. Further, in step S802, the application server 103 also transmits, to the state management server 102, a publication subscription request to refer to and update the state information. Table 7 illustrates a publication subscription request record as an example of each publication subscription request.

TABLE 7

| Publication Subscription Request Record | | |
|---|---|---|
| Request source client name | Publication state information | Subscription state information |
| mfp1 | mfp1 | mfp1 |

A "request source client name" column stores the name of the client apparatus 101 or the application server 103 that transmits a publication subscription request.

A "publication state information" column stores the name of state information to be referenced.

A "subscription state information" column stores the name of state information to be updated.

Upon receiving the publication subscription requests, the connection management unit 344 acquires from the authority information table (table 6) a record where the value in the "request source client name" column in the publication subscription request record (table 7) matches the value in the "connection client name" column in the authority information table. Next, the connection management unit 344 acquires the value in the "state information name" column and the value in the "authority" column in the acquired authority information record and compares the acquired values with the value in the "publication state information" column and the value in the "subscription state information" column in the publication subscription request record. By this comparison, the connection management unit 344 checks whether the request source clients have authority corresponding to the publication subscription requests. If the request source clients have the authority, the connection management unit 344 specifies a record in the connection information table (table 5) where the value in the "connection client name" column in the connection information table matches the value in the "request source client name" column in the publication subscription request record (table 7), The connection management unit 344 stores, in the "publication state information name" column and the "subscription state information name" column in the specified record, the value in the "publication state information" column and the value in the "subscription state information" column, respectively, in the publication subscription request record.

In step S803, if the state information changes, the client apparatus 101 transmits a client state message to the state management server 102.

In step S804, the client management unit 342 of the state management server 102 receives the client state message from the client apparatus 101 via the communication unit 341. Using the received client state message, the client management unit 342 updates the state information file 400 stored in a "state information" column in a record in the client apparatus state information table (table 4) where the state information name matches the client apparatus 101 in table 4.

In step S805, the connection management unit 344 of the state management server 102 searches for a record where the value in the "state information name" column in the client apparatus state information record updated in step S804 matches the value in the "subscription state information" column in the connection information table (table 5). Then, the message generation unit 347 transmits a state information update message via the communication unit 341 to the application server 103 corresponding to the value in the "connection client name" column in the corresponding record. By the above series of processes, the application server 103 can monitor the update of the state of the client apparatus 101 in real time via the state management server 102.

In the description of the series of processes illustrated in FIG. 8, the application server 103 is notified of a change in the state of the client apparatus 101 in real time via the state management server 102, and vice versa. More specifically, the same applies to a case where the state information of the state management server 102 is updated according to an instruction from the application server 103. The client apparatus 101 is notified of an instruction based on the content of the update in real time via the network 100.

By the series of processes illustrated in FIG. 8, the application server 103 can refer to and update the state of the client apparatus 101 in real time via the state management server 102. However, as illustrated in FIGS. 5 to 7, the client apparatus 101 may transition to the sleep mode as appropriate. If the client apparatus 101 transitions to the sleep mode, the session between the client apparatus 101 and the state management server 102 is terminated. More specifically, the record of the corresponding client apparatus 101 is deleted from the connection information table (table 5). In this state, even if the application server 103 transmits a client state message to the state management server 102, the client apparatus 101 cannot receive a notification regarding a change in the state because the client apparatus 101 is cut off from the network 100. As a result, the session between the client apparatus 101 and the state management server 102 is disconnected until the client apparatus 101 returns from the sleep mode and transmits a connection request to the state management server 102 to establish the session.

Figure 9:
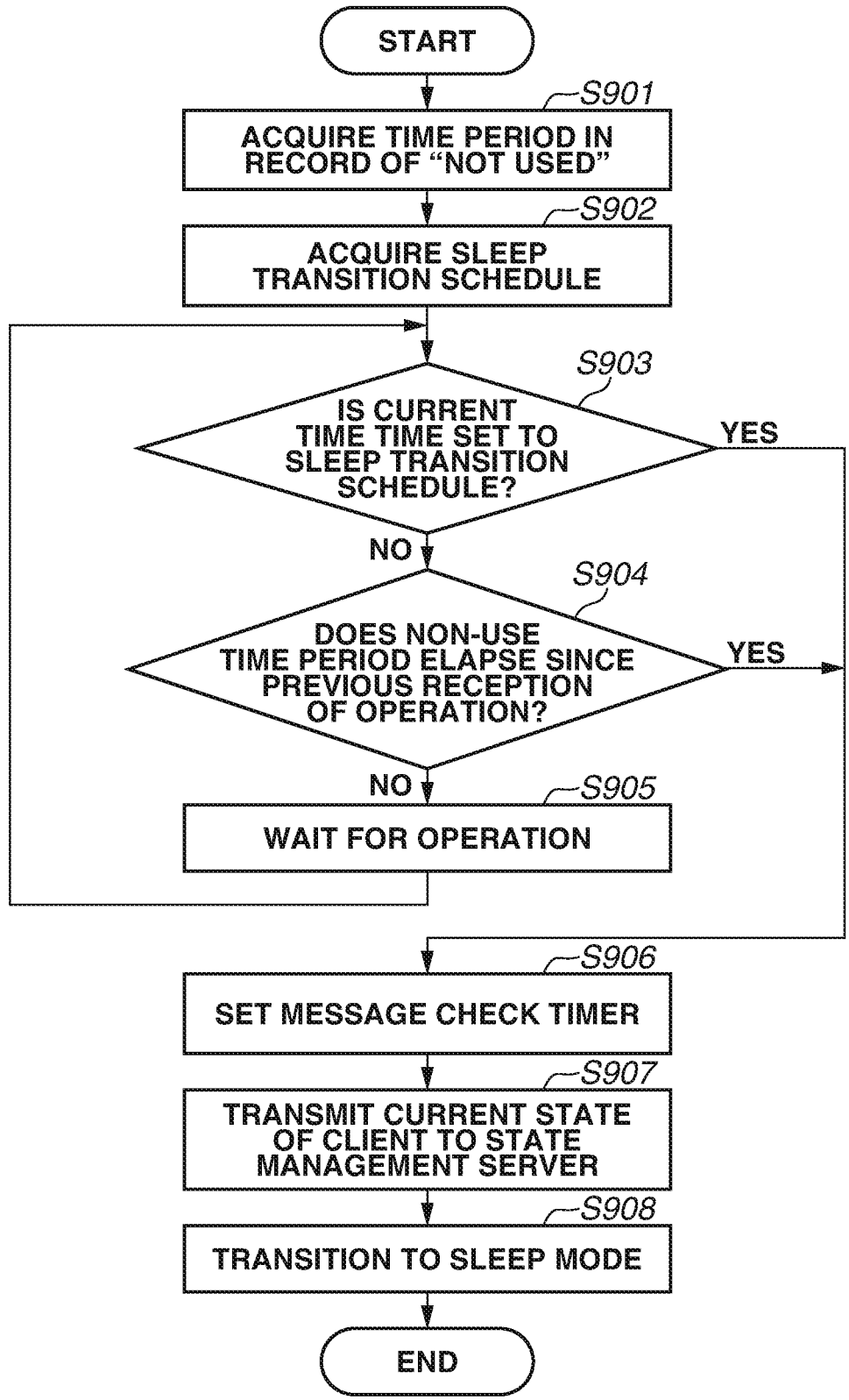
FIG. 9 is a flowchart illustrating processing performed when the client apparatus, to which a state change instruction message check timer is set, transitions to a sleep mode.
Figure 10:
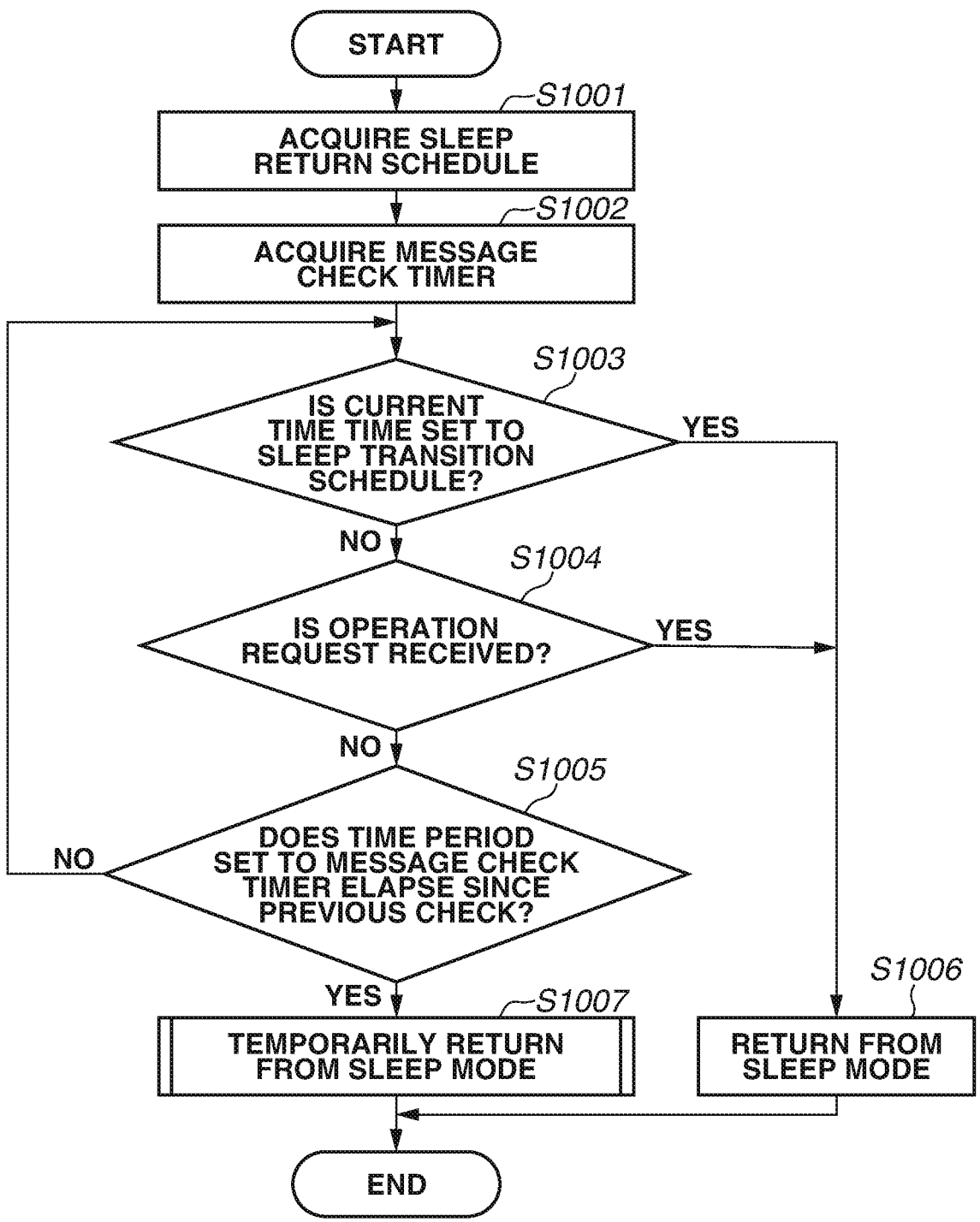
FIG. 10 is a flowchart illustrating processing performed when the client apparatus returns from a sleep mode in a case where a state change instruction message check timer is set.
Figure 11:
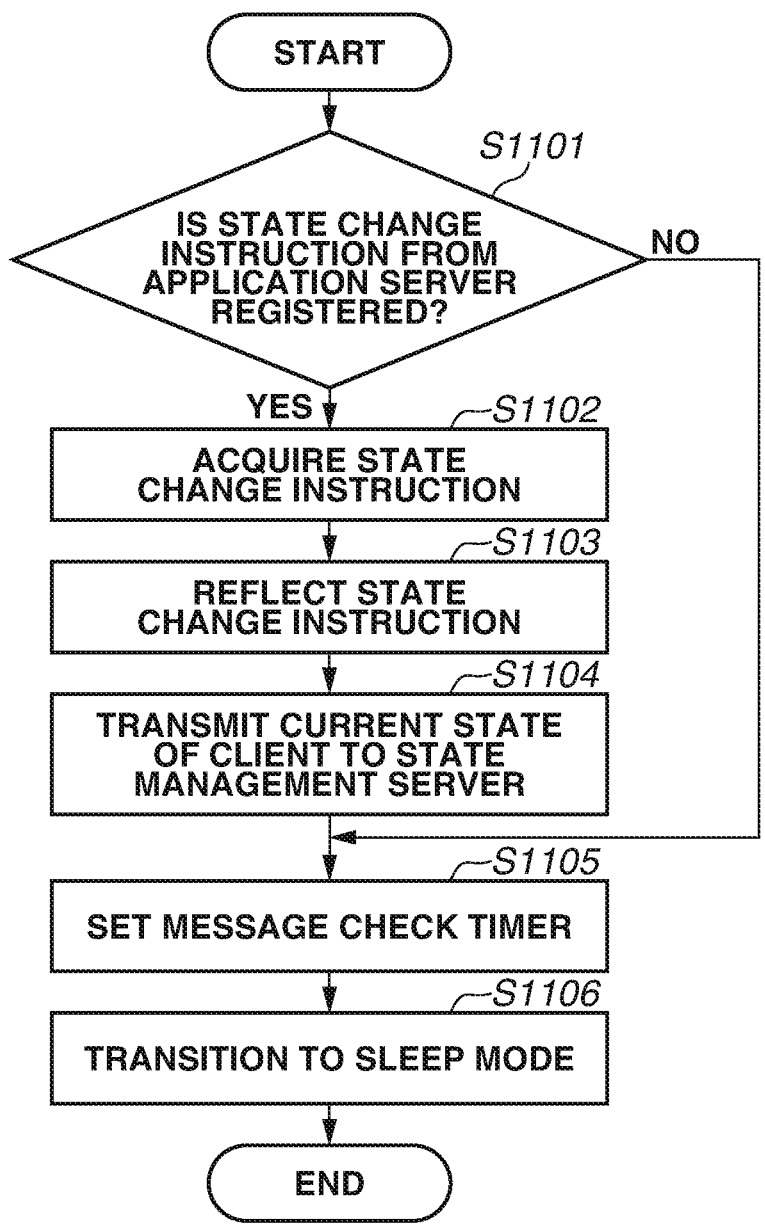
FIG. 11 is a flowchart illustrating processing for checking a state change instruction message of the client apparatus having returned from a sleep mode based on the state change instruction message check timer.

Thus, with reference to FIGS. 9 to 11, a method is illustrated in which, even in a case where the client apparatus 101 is in the sleep mode, the client apparatus 101 can appropriately receive a client state message from the application server 103.

FIG. 9 is a flowchart illustrating a series of processes in which the client apparatus 101 connects to the state management server 102 in step S802 and then transitions to the sleep mode.

The processes of steps S901 to S905 are similar to the processes of steps S501 to S505 illustrated in FIG. 5, and therefore are not described here.

In step S906, a timer management unit 324 acquires a message check interval record from a message check interval table (table 2). Then, the timer management unit 324 registers message check timer information at the time of the sleep mode in the timer information table via the timer management unit 312. Table 8 illustrates a timer information table as an example of the timer information table in which the message check timer information is registered in step S906.

TABLE 8

Timer Information Table

| ID | Operation type | Condition |
|---|---|---|
| 1 | not used | 4 hours |
| 2 | scheduled transition | every day, 21 o'clock |
| 3 | scheduled return | every day, 8 o'clock |
| 4 | sleep mode | 15 minutes |

The table 8 is different from the table 1 in that a record where the ID is "4", the operation type is "sleep mode", and the condition is "15 minutes" is added. In this record, "sleep mode" is stored in the "operation type" column, and the value of an "execution interval" column in the message check interval record acquired in step S906 is stored in the "condition" column. The present exemplary embodiment is described using an example where the execution interval of message check is "15 minutes". However, the execution interval of message check is not limited to this example.

The processes of steps S907 and S908 are similar to the processes of steps S506 and S507 illustrated in FIG. 5, and therefore are not described here.

FIG. 10 is a flowchart illustrating a series of processes in which the client apparatus 101 transitions to the sleep mode and then returns from the sleep mode to check whether an instruction from the application server 103 is present.

The process of step S1001 is similar to the process of step S701 illustrated in FIG. 7, and therefore is not described here.

In step S1002, the timer management unit 312 acquires, as a message check timer value, the value in the "condition" column in a record where the value in the "operation type" column is "sleep mode" in the timer information table (table 8).

The processes of steps S1003 and S1004 are similar to the processes of steps S702 and S703 illustrated in FIG. 7, and therefore are not described here.

In step S1005, the control unit 311 checks whether, at the current time, a time equal to or greater than the message check timer acquired in step S1002 elapses since the client apparatus 101 has transitioned to the sleep mode. If a time equal to or greater than the message check timer elapses (YES in step S1005), the processing proceeds to step S1007. If a time equal to or greater than the message check timer does not elapse (NO in step S1005), step S1003 is executed again. In the process of step S1005, from the next time and thereafter, it is checked whether, at the current time, a time equal to or greater than the value of the message check timer elapses since the process of step S1005 has been previously executed.

The process of step S1006 is similar to the process of step S704 illustrated in FIG. 7, and therefore is not described here. By the process of step S1006, the client apparatus 101 establishes a session with the state management server 102 and becomes able to receive an instruction from the state management server 102 according to a communication method different from that in step S1007.

In step S1007, to check whether an instruction from the application server 103 is registered in the state management server 102, the control unit 311 temporarily returns from the sleep mode. With reference to FIG. 11, the details of the process of step S1007 are described.

FIG. 11 is a flowchart illustrating a series of processes in which, in step S1007, the client apparatus 101 temporarily returns from the sleep mode and checks whether an instruction from the application server 103 is registered in the state management server 102.

In step S1101, via the communication unit 321, a module 320 inquires of a module 340 about whether a state change instruction from the application server 103 is present. Upon receiving the inquiry from the module 320, the module 340 acquires, from the client apparatus state information table (table 4), a client apparatus state information record where the client apparatus 101 from which the inquiry is received matches the value in a "client apparatus name" column, Next, the module 340 acquires the state information file 400 stored in the "state information" column, A state change instruction message 410 illustrated in FIG. 4B is an example of a message to be transmitted to the client apparatus 101.

In an instruction portion 411, an execution instruction to execute calibration is described. Other main components are similar to those of the state information file 400, and therefore are not described here. If a state change instruction from the application server 103 is present (YES in step S1101), the content of the instruction is inserted as in the instruction portion 411. Then, If the content is stored in the instruction portion 411, the client management unit 342 determines that a state change instruction from the application server 103 is present (YES in step S1101), and the processing proceeds to step S1102. Then, the client management unit 342 transmits the execution instruction as the state change instruction message 410 to the client apparatus 101.

If no value is stored in the instruction portion 411, the client management unit 342 determines that a state change instruction from the application server 103 is not present (NO in step S1101), and the processing proceeds to step S1105.

In step S1102, a message analysis unit 323 of the client apparatus 101 receives the state change instruction message 410 via the communication unit 321. In step S1102, a communication method (Hypertext Transfer Protocol (HTTP)) is used in which the client apparatus 101 makes a request to the state management server 102 and thereby can receive an instruction. At this time, since the client apparatus 101 temporarily transitions from the sleep state to a normal state, a session is not established between the client apparatus 101 and the state management server 102.

In step S1103, the message analysis unit 323 refers to the instruction portion 411 of the state change instruction message 410 received in step S1102 and transmits the instruction portion 411 to a control unit 331 of a module 330. Then, according to the content of the instruction portion 411, the module 330 changes the state and the setting of the client apparatus 101, thereby updating a client management unit 332.

In step S1104, the message generation unit 322 updates the state portion 403 using the state and the setting value of the client apparatus 101 changed in step S1103, Further, the message generation unit 322 generates a client state message 420 indicating that the client apparatus 101 is to transition to the sleep mode. Then, the message generation unit 322 transmits the client state message 420 to the state management server 102 via the communication unit 321.

The client state message 420 illustrated in FIG. 4C is a file to be transmitted from the client apparatus 101 to the state management server 102. In a portion 421, an instruction is not particularly described. A portion 422 indicates that calibration is executed. A portion 423 indicates that the client apparatus 101 transitions to the sleep mode.

Using the received client state message 600 (FIG. 6A) at the time of transition to the sleep mode, the client management unit 342 of the state management server 102 updates the corresponding state information file 400 in the state information managed in the client apparatus state information table (table 4).

In step S1105, the timer management unit 324 registers the message check timer value acquired in step S1002 as message check timer information at the time of the sleep mode in the timer information table (table 8) via the timer management unit 312.

In step S1106, the control unit 311 causes the client apparatus 101 to transition to the sleep mode again. At this time, different from the processing illustrated in FIG. 5, the client apparatus 101 transitions to the sleep mode without waiting for a certain time period to receive a user operation.

By the series of processes illustrated in FIGS. 10 and 11, the client apparatus 101 transitions to the sleep mode and then temporarily returns from the sleep mode. When temporarily returning from the sleep mode, the client apparatus 101 completes processing based on an instruction from the state management server 102 and then transitions to the sleep mode. Through this operation, even if an instruction from the application server 103 is registered in the state management server 102, it is possible to reflect the instruction from the application server 103 on the client apparatus 101 as soon as possible. The series of processes illustrated in FIGS. 10 and 11 is repeated until the client apparatus 101 returns from the sleep mode in step S1006.

It is desirable that a state change instruction registered in the state management server 102 by the application server 103 should be reflected on the corresponding client apparatus 101 immediately after the state change instruction is registered. The first exemplary embodiment has illustrated a method for reflecting the state change instruction as soon as possible even in a situation where the client apparatus 101 transitions to the sleep mode and a connection with the state management server 102 is cut. However, depending on the condition under which the client apparatus 101 transitions to the sleep mode, the state change instruction registered in the state management server 102 does not necessarily need to be instantly reflected. For example, when the client apparatus 101 transitions to the sleep mode according to a schedule setting, there is a case where a user to use the client apparatus 101 cannot be expected during the sleep mode, depending on the setting. In such a case, the state change instruction may be reflected at any timing until the client apparatus 101 returns from the sleep mode and becomes able to be used again. Further, for example, when the client apparatus 101 transitions to the sleep mode because the client apparatus 101 is not used for a certain time period, it is unclear when the user will operate the client apparatus 101. In such a case, the user of the client apparatus 101 is influenced thereby. Thus, it is necessary to reflect the state change instruction as soon as possible.

A second exemplary embodiment illustrates a method for, according to the condition under which the client apparatus 101 transitions to the sleep mode, appropriately controlling the timing when a state change instruction registered in the state management server 102 is checked.

Figure 12:
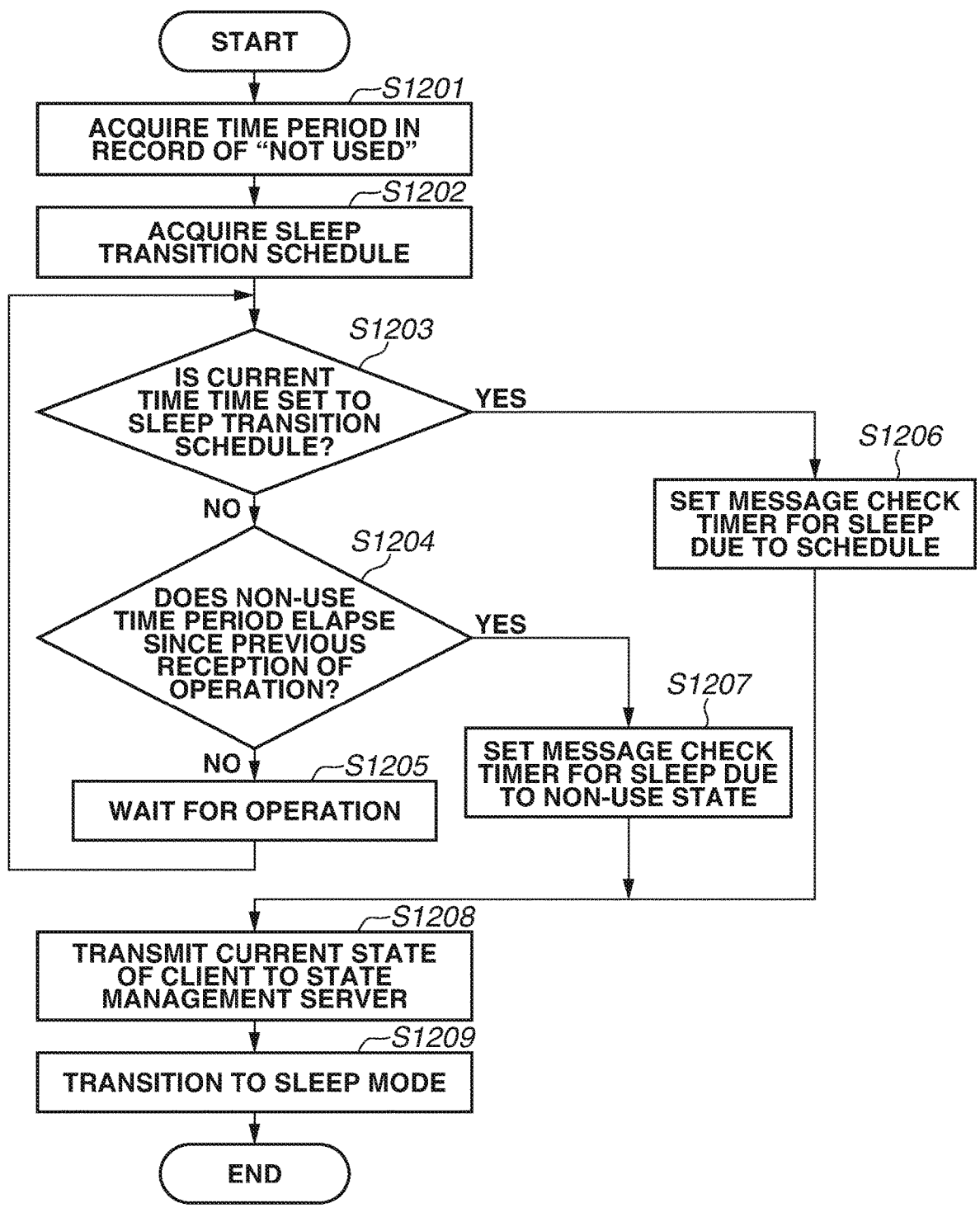
FIG. 12 is a flowchart illustrating processing performed when the client apparatus, to which the state change instruction message check timer is set, transitions to a sleep mode based on a reason for transitioning to a sleep mode.

FIG. 12 is a flowchart illustrating a series of processes in which, when the client apparatus 101 transmits a connection request to the state management server 102 as illustrated in step S801 and then transitions to the sleep mode, a message check timer is set according to the condition under which the client apparatus 101 transitions to the sleep mode.

The processes of steps S1201 and S1202 are similar to the processes of steps S501 and S502 illustrated in FIG. 5, and therefore are not described here.

In step S1203, the control unit 311 compares the current time with the scheduled transition time acquired in step S1202 and stored in the "condition" column in the record where the value in the "operation type" column is "scheduled transition". If the current time is before the scheduled transition tune (NO in step S1203), the processing proceeds to step S1204. If the current time matches or is after the scheduled transition time (YES in step S1203), the processing proceeds to step S1206.

In step S1204, the control unit 311 checks whether the client apparatus 101 is not used for the time period acquired in step S1201 and stored in the "condition" column in the record where the value in the "operation type" column is "not used". If the time period for which the client apparatus 101 is not used is less than the time period stored in the "condition" column in the record with "not used" (NO in step S1204), the processing proceeds to step S1205. If the state where the client apparatus 101 is not used continues for a time period equal to or greater than the time period stored in the "condition" column in the record with "not used" (YES in step S1204), the processing proceeds to step S1207.

In step S1205, the control unit 311 waits for an operation from the user and executes the process of step S1203 again.

In steps S1206 and S1207, the timer management unit 324 acquires a condition-by-condition message check interval record from a condition-by-condition message check interval table. In the present exemplary embodiment, table 9 illustrates a condition-by-condition message check interval table as an example of a condition-by-condition message check interval managed by the timer management unit 324.

TABLE 9

| ID | Sleep type | Execution interval |
|---|---|---|
| 1 | not used | 15 minutes |
| 2 | schedule | 1 hour |

An "ID" column is a column that stores an identifier for uniquely identifying a message check interval in the module 320.

A "sleep type" column is a column that stores information for identifying the condition under which the client apparatus 101 transitions to the sleep mode. If the client apparatus 101 is to transition to the sleep mode because the client apparatus 101 does not receive a user operation for a certain time period, this corresponds to "not used". If, on the other hand, the client apparatus 101 is to transition to the sleep mode according to a schedule determined in advance by the timer execution unit 313, this corresponds to "schedule". At each predetermined time period stored in the "execution interval" column, the client apparatus 101 returns from the sleep state and communicates with the state management server 102. At this time, the time period of the execution interval in the case of "schedule" is longer than the time period of the execution interval in the case of "not used". In the case of "schedule", it is less likely that the client apparatus 101 is used by the user until the scheduled time of return from the sleep mode. Thus, the update is checked less frequently. In the case of "schedule", instead of the time period of the execution interval, a predetermined time may be managed as an execution time.

An "execution interval" column is a column that stores the value of the execution interval at which the module 320 checks the update of a state change instruction message with the state management server 102.

In step S1206, the timer management unit 324 determines that the client apparatus 101 is to transition to the sleep mode according to the schedule. The tinier management unit 324 acquires a record where the value of the "sleep type" column matches "schedule" in the condition-by-condition message check interval table. Then, the timer management unit 324 registers the value of the "execution interval" column in the acquired record as message check timer information at the time of the sleep mode in the timer information table.

In step S1207, the timer management unit 324 determines that the client apparatus 101 is to transition to the sleep mode according to the lapse of a non-use time. The timer management unit 324 acquires a record where the value in the "sleep type" column matches "not used" in the condition-by-condition message check interval table. Then, the timer management unit 324 registers the value of the "execution interval" column in the acquired record as message check timer information at the time of the sleep mode in the timer information table.

The processes of steps S1208 and S1209 are similar to the processes of steps S907 and S908 illustrated in FIG. 9, and therefore are not described here.

By the series of processes illustrated in FIG. 12, according to the condition under which the client apparatus 101 transitions to the sleep mode, it is possible to appropriately control the timing when a state change instruction registered in the state management server 102 is checked.

Depending on the content of a state change instruction registered in the state management server 102 by the application server 103, there is a case where the client apparatus 101 cannot be used during the reflection of the state change instruction. For example, there is a case where, because the result of a user operation changes before and after the reflection of an instruction, the client apparatus 101 intentionally does not receive the execution of the user operation during the reflection of the instruction. Further, there can also be a case where the client apparatus 101 restarts the client apparatus 101 itself as the post-processing of the reflection of an instruction.

When, by the methods illustrated in the first and second exemplary embodiments, the client apparatus 101 checks the state management server 102 whether a state change instruction is present, and in a case where the client apparatus 101 returns from the sleep mode according to a user operation, it is assumed that a user operation will be executed immediately after the return. If the client apparatus 101 reflects a state change instruction by which the client apparatus 101 cannot be used as described above immediately after the return, the client apparatus 101 cannot receive a user operation. Thus, the user needs to wait during that time period.

A third exemplary embodiment illustrates a method for controlling the reflection of a state change instruction by the client apparatus 101 while maintaining the convenience of a user operation.

Figure 13:
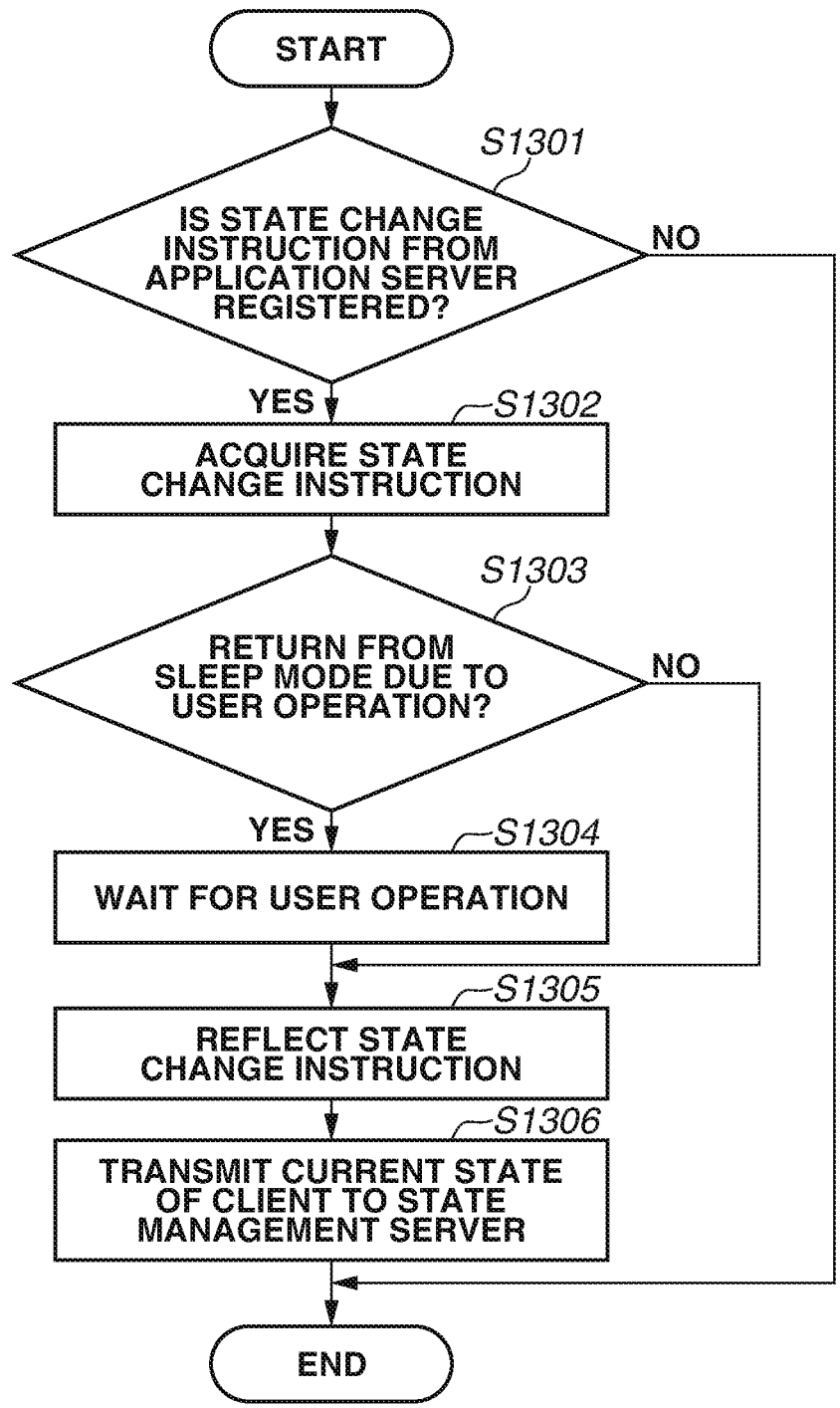
FIG. 13 is a flowchart illustrating processing in which the client apparatus controls a timing of reflection of the state change instruction message based on a reason for returning from a sleep mode.

FIG. 13 is a flowchart illustrating a series of processes in which, when the client apparatus 101 returns from the sleep mode in step S1006, the timing of the reflection of a state change instruction is controlled according to the reason for the return.

In step S1301, via the communication unit 321, the module 320 inquires of the module 340 about whether a state change instruction from the application server 103 is present. Upon receiving the inquiry from the module 320, the module 340 acquires, from the client apparatus state information table, a client apparatus state information record where the client apparatus 101 from which the inquiry is received matches the value in the "client apparatus name" column. Next, the module 340 acquires the state information file 400 stored in the "state information" column. If a state change instruction from the application server 103 is present, the content of the instruction is inserted as in the instruction portion 411. Then, the client management unit 342 determines that the application server 103 gives an execution instruction to the client apparatus 101. Then, the client management unit 342 transmits the execution instruction as the state change instruction message 410 to the client apparatus 101. If no value is stored in the instruction portion 411, the client management unit 342 determines that a state change instruction from the application server 103 is not present (NO in step S1301), and the processing proceeds to step S1305.

In step S1302, the message analysis unit 323 of the client apparatus 101 receives the state change instruction message 410 via the communication unit 321.

In step S1303, the control unit 311 checks the reason why the client apparatus 101 returns from the sleep mode. More specifically, based on the processing results in steps S1003 and S1004, the control unit 311 checks the reason why the client apparatus 101 returns from the sleep mode. If it is determined that the client apparatus 101 receives an operation request from the user in the process of step S1004 (YES in step S1303), the processing proceeds to step S1304. Further, if it is determined that the current time is before the scheduled return time in the process of step S1003 (NO in step S1303), the processing proceeds to step S1305.

In step S1304, the control unit 311 waits for an operation from the user. Then, at the timing when the operation from the user is completed, the processing proceeds to step S1305. If the client apparatus 101 returns from the sleep mode according to the fact that the client apparatus 101 receives a user operation, then after a user operation is completed in step S1304, processing based on the received instruction is executed in step S1305.

In step S1305, the message analysis unit 323 refers to the instruction portion 411 of the state change instruction message 410 received in step S1302 and transmits the instruction portion 411 to the control unit 331 of the module 330. Then, according to the content of the instruction portion 411, the module 330 changes the state and the setting of the client apparatus 101 to update the client management unit 332.

In step S1306, the message generation unit 322 updates the state portion 403 using the state and the setting value of the client apparatus 101 changed in step S1305. Further, the message generation unit 322 generates the client state message 420 indicating that the client apparatus 101 is to transition to the sleep mode. Then, the message generation unit 322 transmits the client state message 420 to the state management server 102 via the communication unit 321. Using the received client state message 600 at the time of transition to the sleep mode, the client management unit 342 of the state management server 102 updates the corresponding state information file 400 in the state information managed in the client apparatus state information table.

By the series of processes illustrated in the flowchart in FIG. 13, it is possible, based on the presence or absence of a user operation, to control the timing when a state change instruction is processed immediately after the client apparatus 101 returns from the sleep mode. In this way, it is possible to avoid the situation where, in a case where the user causes the client apparatus 101 to return from the sleep mode, a state change instruction is executed, and an operation that should be performed normally by the user cannot be executed.

On the other hand, depending on the content of a state change instruction, there is also a case where the state change instruction can be executed in parallel without hindering the execution of a user operation. In this case, the client apparatus 101 does not necessarily need to give priority to the execution of the user operation.

Figure 14:
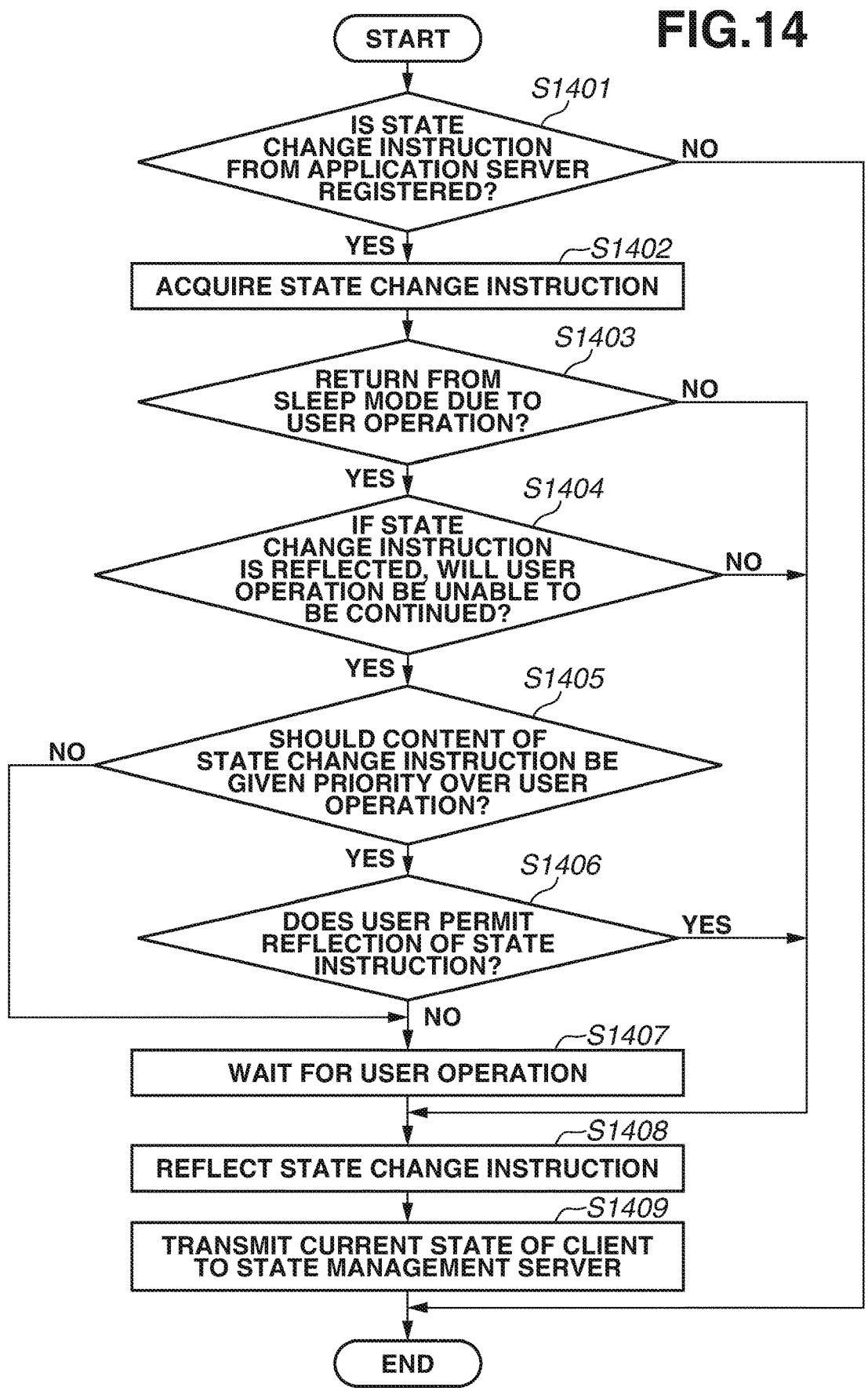
FIG. 14 is a flowchart illustrating processing in which the client apparatus controls the timing of the reflection of the state change instruction message based on a content of the state change instruction message.

FIG. 14 is a flowchart illustrating a series of processes in which, in the series of processes illustrated in FIG. 13, the client apparatus 101 controls the timing of the reflection of a state change instruction, taking into account both the content of the state change instruction and the reason why the client apparatus 101 returns from the sleep mode.

The processes of steps S1401 to S1403 are similar to the processes of steps S1301 to S1303 illustrated in FIG. 13, and therefore are not described here.

In step S1404, the message analysis unit 333 analyzes the state change instruction message acquired from the message analysis unit 323 via the communication unit 321 in step S1402. Then, if the message analysis unit 333 determines that if a message execution unit 334 executes the content of the state change instruction message on the client apparatus 101, the client apparatus 101 will temporarily enter the state where a user operation cannot be performed on the client apparatus 101 (YES in step S1404), the processing proceeds to step S1405, if not (NO in step S1404), the processing proceeds to step S1408.

FIGS. 15A and 15B are diagrams illustrating examples of the state change instruction message acquired in step S1402.

A state change instruction message 1500 illustrated in FIG. 15A is an example of the message based on which the message analysis unit 333 determines in step S1404 that if the message execution unit 334 executes the content of the message, the client apparatus 101 will enter the state where a user operation cannot be performed on the client apparatus 101. Hereinafter, the state change instruction message 1500 will be referred to as the "message 1500".

In the message 1500, a client apparatus correction instruction 1501 (hereinafter referred to as an "instruction 1501") is described. The instruction 1501 includes priority information 1502 and user influence information 1503 when the instruction is executed.

The priority information 1502 is an item indicating the execution priority of the instruction 1501. For example, if the value of the priority information 1502 is "need", this indicates that the instruction should be executed in priority to a user operation.

The user influence information 1503 is an item indicating the degree of influence on the user when the instruction 1501 is executed. For example, if the value of the user influence information 1503 is "not available", this indicates that if the message execution unit 334 executes the instruction 1501, the client apparatus 101 cannot be operated during that time period.

A state change instruction message 1510 illustrated in FIG. 15B is an example of the message based on which the message analysis unit 333 determines in step S1404 that even if the message execution unit 334 executes the content of the message, the client apparatus 101 will enter the state where a user operation can be performed on the client apparatus 101. Hereinafter, the state change instruction message 1510 will be referred to as the "message 1510".

In the message 1510, a client apparatus time correction instruction 1511 (hereinafter referred to as an "instruction 1511") is described. The instruction 1511 includes priority information 1512 and user influence information 1513 when the instruction is executed.

The priority information 1512 is an item indicating the execution priority of the instruction 1511. For example, if the value of the priority information 1502 is "normal", this indicates that the instruction does not necessarily need to be executed in priority to a user operation.

The user influence information 1513 is an item indicating the degree of influence on the user when the instruction 1511 is executed. For example, if the value of the user influence information 1513 is "available", this indicates that if the message execution unit 334 executes the instruction 1511, the client apparatus 101 can be operated also during that time period.

In step S1405, the message analysis unit 333 further analyzes the content of the state change instruction message. Then, if the message analysis unit 333 determines that the state change instruction message should be given priority over a user operation (YES in step S1405), the processing proceeds to step S1406. More specifically, this corresponds to a case where the value of the priority information 1502 is "need".

Further, if the message analysis unit 333 determines that the state change instruction message should not be given priority over a user operation (NO in step S1405), the processing proceeds to step S1407. More specifically, this corresponds to a case where the value of the priority information 1502 is "normal".

In step S1406, the control unit 331 displays an instruction execution confirmation dialog 1600 (hereinafter referred to as a "dialog 1600") to the user through a cathode ray tube (CRT) 210 and inquires of the user about whether to give priority to the execution of the instruction or give priority to the execution of a user operation.

Figure 16:
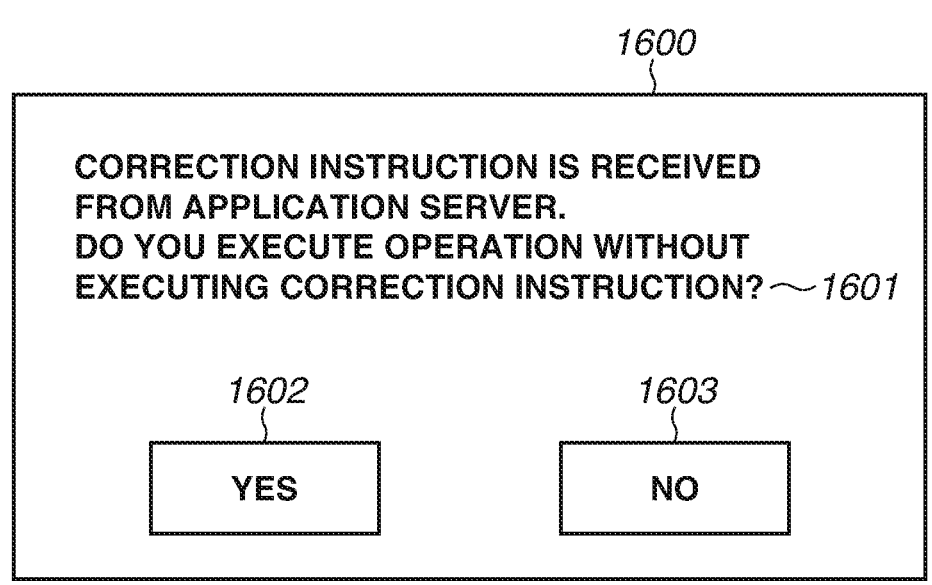
FIG. 16 is a diagram illustrating an example of a state change instruction reflection confirmation dialog displayed on the client apparatus in FIG. 14.

FIG. 16 is a diagram illustrating an example of the dialog 1600 displayed on the CRT 210 in step S1406.

The dialog 1600 includes an instruction execution confirmation message display label 1601, an instruction execution button 1602, and an operation execution button 1603.

The instruction execution confirmation message display label 1601 is a label indicating, to the user, a message that the client apparatus 101 receives a state change instruction message that should be executed by the client apparatus 101.

If the instruction execution button 1602 is pressed, the client apparatus 101 determines that the user permits the reflection of the instruction in priority to the operation of the user themselves (YES in step S1405), and the processing proceeds to step S1408.

If the operation execution button 1603 is pressed, the client apparatus 101 determines that the user operation is given priority over the reflection of the instruction (NO in step S1405), and the processing proceeds to step S1407. In step S1407, the client apparatus 101 waits until the user operation is completed.

In step S1408, the message analysis unit 323 refers to the instruction portion 1501 of the state change instruction message 1500 received in step S1402 and transmits the instruction portion 1501 to the control unit 331 of the module 330. Then, according to the content of the instruction portion 1501, the module 330 changes the state and the setting of the client apparatus 101 to update the client management unit 332.

In step S1409, the message generation unit 322 updates the state portion 403 using the state and the setting value of the client apparatus 101 changed in step S1408. Further, the message generation unit 322 generates the client state message 420 indicating that the client apparatus 101 is to transition to the sleep mode. Then, the message generation unit 322 transmits the client state message 420 to the state management server 102 via the communication unit 321. Using the received client state message 600 at the time of transition to the sleep mode, the client management unit 342 of the state management server 102 updates the corresponding state information file 400 in the state information managed in the client apparatus state information table.

By the series of processes illustrated in FIGS. 14 to 16, according to the content of a state change instruction, it is possible to execute a user operation and the state change instruction and appropriately execute processing that should be given priority.

The first to third exemplary embodiments have illustrated methods in which, even in the situation where the client apparatus 101 transitions to the sleep mode and a network connection is disconnected, the client apparatus 101 returns from the sleep mode as appropriate, thereby appropriately receiving and reflecting a state change instruction.

By the series of processes illustrated in FIG. 8, the client apparatus 101 and the application server 103 can exchange data with each other in real time via the state management server 102. Thus, even if the client apparatus 101 is used in various manners, the application server 103 can flexibly transmit a state change instruction to the client apparatus 101 at a required timing.

On the other hand, if the client apparatus 101 is used with regularity, the timing when the application server 103 transmits a state change instruction according to this regularity may also have regularity. In such a case, after the client apparatus 101 transitions to the sleep mode, and even if the client apparatus 101 periodically checks the state management server 102 whether a state change instruction is present, it is highly likely that the check processing results in vain.

A fourth exemplary embodiment illustrates a method for, after the client apparatus 101 transitions to the sleep mode, then based on the history of the reception of a state change instruction from the application server 103, determining the interval at which it is checked with respect to the state management server 102 whether a state change instruction is present, and receiving the state change instruction.

Figure 17:
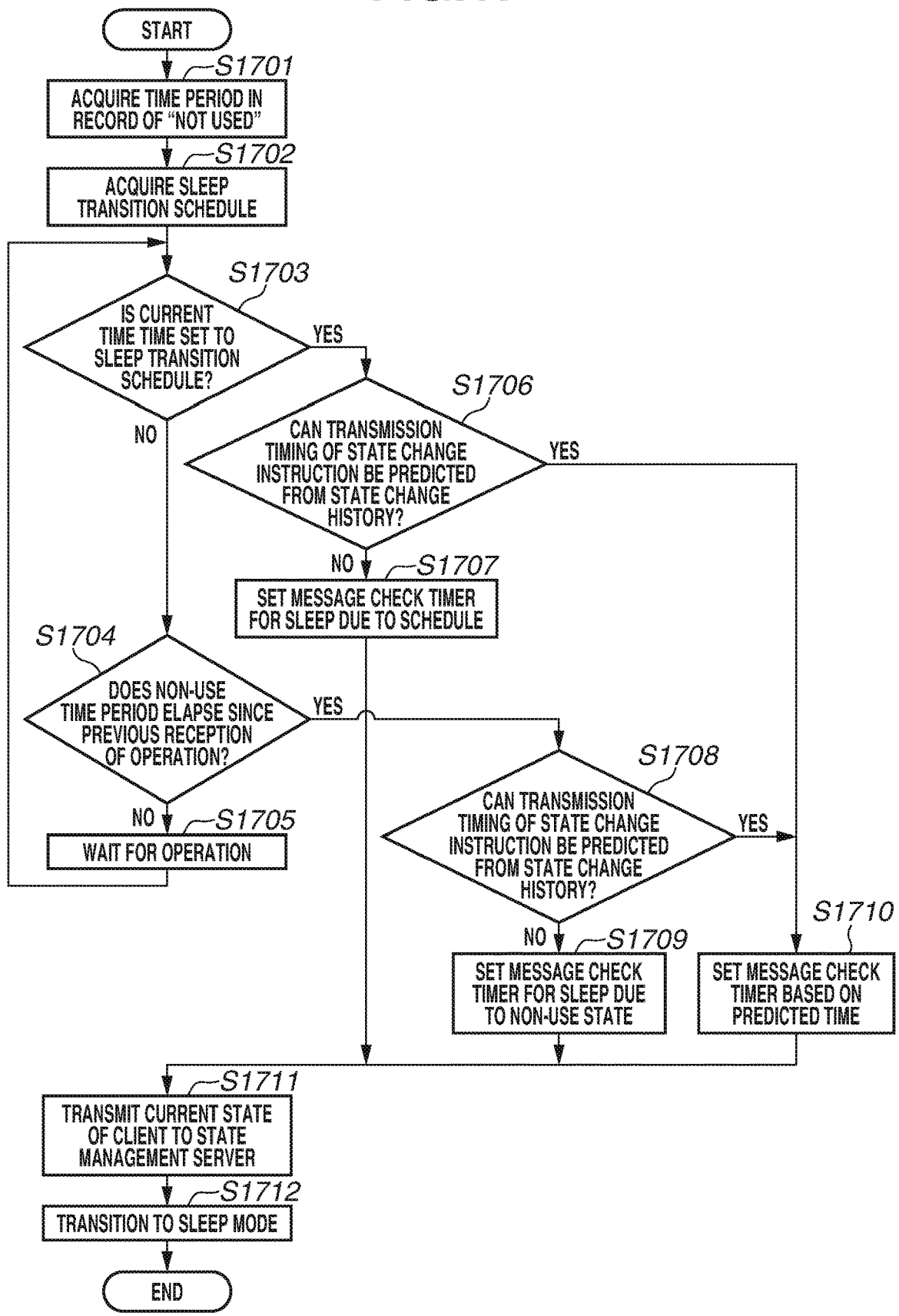
FIG. 17 is a flowchart illustrating processing performed when the client apparatus, to which the state change instruction message check timer is set based on an execution history of a state change instruction, transitions to a sleep mode.

FIG. 17 is a flowchart illustrating an example of the process of, when determining a message check timer based on which the client apparatus 101 transitions to the sleep mode, then based on the history of a state change instruction message received in the past, predicting and determining the time when the client apparatus 101 should return from the sleep mode.

The processes of steps S1701 and S1702 are similar to the processes of steps S901 and S902 illustrated in FIG. 9, and therefore are not described here.

In step S703, the control unit 311 compares the current time with the scheduled transition time acquired in step S1702 and stored in the "condition" column in the record where the value of the "operation type" column is "scheduled transition. If the current time is before the scheduled transition time (NO in step S1703), the processing proceeds to step S1704. If the current time matches or is after the scheduled transition time (YES in step S1703), the processing proceeds to step S1706.

In step S1704, the control unit 311 confirms whether the client apparatus 101 is not used for the time period acquired in step S1701 and stored in the "condition" column in the record where the value of the "operation type" column is "not used". If the time period during which the client apparatus 101 is not used is less than the time period stored in the "condition" column in the record with "not used" (NO in step S1704), the processing proceeds to step S1705. If the state where the client apparatus 101 is not used continues for a time period equal to or greater than the time period stored in the "condition" column in the record with "not used" (YES in step S1704), the processing proceeds to step S1708.

In step S1705, the control unit 311 waits for an operation from the user and executes the process of step S1703 again.

In steps S1706 and S1708, the control unit 311 checks the content of a state change instruction message execution history record registered in an execution history table managed by a history management unit 325. The control unit 311 acquires the values in a "date and time information" column in the state change instruction message execution history records where an "application name" column is the same. Then, the control unit 311 calculates time periods in which state change instructions from the application server 103 and corresponding to the values in a "past application name" column are processed. To take records registered in table 3 as examples, the execution history of an instruction from the application server 103 for providing a calibration service concentrate between 21 o'clock and 22 o'clock every day. In this case, the control unit 311 predicts that a predetermined time when the client apparatus 101 returns from the sleep mode and receives an execution instruction from the application server 103 will be 21 o'clock every day. Then, in step S1710, the timer management unit 324 registers, in the timer information table, a timer information record where "sleep mode" is stored in the "operation type" column, and "every day, 21 o'clock" is stored in the "condition" column. If information necessary for the control unit 311 to predict the transmission timing of an execution instruction is not present in the execution history table, and the control unit 311 cannot predict the transmission timing of an execution instruction (NO in step S1706), the processing proceeds to step S1707.

In step S1707, the timer management unit 324 determines that the client apparatus 101 is to transition to the sleep mode according to the schedule. The timer management unit 324 acquires a record where the value of the "sleep type" column matches "schedule" in the condition-by-condition message check interval table. Then, the timer management unit 324 registers, into the timer information table, the value in the "execution interval" column in the acquired record as message check timer information at the time of the sleep mode.

In step S1709, the timer management unit 324 determines that the client apparatus 101 is to transition to the sleep mode according to the lapse of a non-use time. The tinier management unit 324 acquires a record where the value in the "sleep type" column matches "not used" in the condition-by-condition message check interval table. Then, the timer management unit 324 registers, into the timer information table, the value of the "execution interval" column in the acquired record as message check tinier information at the time of the sleep mode. The processes of steps S1711 and S1712 are similar to the processes of steps S907 and S908 illustrated in FIG. 9, and therefore are not described here.

By the series of processes illustrated in FIG. 17, when the client apparatus 101 transitions to the sleep mode, it is possible to control a timer for checking a state change instruction at a timing that can be predicted from an instruction execution history in the past.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-162176, filed Aug. 25, 2017, which is hereby incorporated by reference herein in its entirety.

What is claimed is:

1. A client apparatus configured to cause a state of the client apparatus to transition from a normal state to a sleep state when the client apparatus does not receive a user operation for a certain time period, the client apparatus comprising:
   a memory storing instructions; and
   a processor executing the instructions causing the client apparatus to:
   perform control so that, in a case where the state of the client apparatus transitions from the sleep state to the normal state by receiving a user operation, communication with a management server for managing an instruction to the client apparatus is started according to a first communication method allowing the client apparatus to receive an instruction from the management server without a request from the client apparatus;
   communicate with the management server to acquire an instruction from the management server in a case where the state of the client apparatus temporarily transitions from the sleep state to the normal state without the client apparatus receiving a user operation;
   perform control so that after the communication is performed when the client apparatus is temporarily in the normal state, the state of the client apparatus transitions from the normal state to the sleep state; and
   in a case where the client apparatus receives an instruction from the management server through the communication according to the first communication method when the state of the client apparatus transitions from the sleep state to the normal state by receiving a user operation and (1) in a case where the processing based on the received instruction hinders the processing based on the user operation, execute processing based on the received instruction after processing corresponding to the received user operation is completed,
   wherein (2) in a case where the processing based on the received instruction does not hinder the processing based on the user operation, the processing based on the received instruction is executed without waiting for the completion of the processing based on the user operation.

2. The client apparatus according to claim 1, wherein, in a case where the client apparatus temporarily transitions to the normal state, and when the client apparatus transmits, to the management server, a request to acquire an instruction to the client apparatus, communication according to a second communication method different from the first communication method is performed.

3. The client apparatus according to claim 2, wherein, when the communication is performed according to the first communication method, different from the communication according to the second communication method, a session for receiving an instruction from the management server without a request from the client apparatus is established between the client apparatus and the management server.

4. The client apparatus according to claim 1, wherein the instructions further cause the client apparatus to:
   execute processing based on the instruction from the management server in a case where an instruction from the management server is acquired through the communication performed when the client apparatus temporarily transitions to the normal state; and
   perform control so that, after the processing based on the instruction is completed, the state of the client apparatus transitions from the normal state to the sleep state without the client apparatus waiting for the certain time period.

5. The client apparatus according to claim 1, wherein in a case where the client apparatus is in the sleep state, the client apparatus temporarily transitions from the sleep state to the normal state according to a predetermined condition without receiving a user operation.

6. The client apparatus according to claim 5, wherein the instructions further cause the client apparatus to:
   manage an execution history of processing based on an instruction from the management server; and
   determine the predetermined condition based on the managed execution history.

7. The client apparatus according to claim 1,
   wherein in a case where the client apparatus transitions to the sleep state according to a schedule, the client apparatus temporarily transitions from the sleep state to the normal state at each first predetermined time period without receiving a user operation, and
   wherein in a case where the client apparatus transitions to the sleep state by not receiving a user operation for the certain time period, the client apparatus temporarily transitions from the sleep state to the normal state at each second predetermined time period shorter than the first predetermined time period without receiving a user operation.

8. A method for a client apparatus that transitions from a normal state to a sleep state when the client apparatus does not receive a user operation for a certain time period, the method comprising:
   performing control so that in a case where the state of the client apparatus transitions from the sleep state to the normal state by receiving a user operation, communication with a management server for managing an instruction to the client apparatus is started according to a first communication method allowing the client apparatus to receive an instruction from the management server without a request from the client apparatus;
   communicating with the management server to acquire an instruction from the management server in a case where the client apparatus temporarily transitions from the sleep state to the normal state without the client apparatus receiving a user operation;
   performing control so that, after the communication is performed when the client apparatus is temporarily in the normal state, the client apparatus transitions from the normal state to the sleep state; and
   in a case where the client apparatus receives an instruction from the management server through the communication according to the first communication method when the state of the client apparatus transitions from the sleep state to the normal state by receiving a user operation and (1) in a case where the processing based on the received instruction hinders the processing based on the user operation, executing processing based on the received instruction after processing corresponding to the received user operation is completed,
   wherein (2) in a case where the processing based on the received instruction does not hinder the processing based on the user operation, the processing based on the received instruction is executed without waiting for the completion of the processing based on the user operation.

9. A non-transitory computer readable storage medium on which is stored a computer program for making a computer execute a method for a client apparatus that transitions from a normal state to a sleep state when the client apparatus does not receive a user operation for a certain time period, the method comprising:
   performing control so that in a case where the state of the client apparatus transitions from the sleep state to the normal state by receiving a user operation, communication with a management server for managing an instruction to the client apparatus is started according to a first communication method allowing the client apparatus to receive an instruction from the management server without a request from the client apparatus;
   communicating with the management server to acquire an instruction from the management server in a case where the client apparatus temporarily transitions from the sleep state to the normal state without the client apparatus receiving a user operation;
   performing control so that, after the communication is performed when the client apparatus is temporarily in the normal state, the client apparatus transitions from the normal state to the sleep state; and
   in a case where the client apparatus receives an instruction from the management server through the communication according to the first communication method when the state of the client apparatus transitions from the sleep state to the normal state by receiving a user operation and (1) in a case where the processing based on the received instruction hinders the processing based on the user operation, executing processing based on the received instruction after processing corresponding to the received user operation is completed,
   wherein (2) in a case where the processing based on the received instruction does not hinder the processing based on the user operation, the processing based on the received instruction is executed without waiting for the completion of the processing based on the user operation.

10. A client apparatus configured to cause a state of the client apparatus to transition from a normal state to a sleep state when the client apparatus does not receive a user operation for a certain time period, the client apparatus comprising:
   a memory storing instructions; and
   a processor executing the instructions causing the client apparatus to:
      perform control so that, in a case where the state of the client apparatus is the normal state, communication with a management server for managing an instruction to the client apparatus is started according to a first communication method allowing the client apparatus to receive an instruction from the management server without a request from the client apparatus; and in a case where the client apparatus receives an instruction from the management server through the communication according to the first communication method when the state of the client apparatus transitions from the sleep state to the normal state by receiving a user operation, execute processing corresponding to the received user operation before execution of processing that is based on the received instruction and is expected to hinder the processing corresponding to the received user operation.

11. The client apparatus according to claim 10, wherein the instructions further cause the client apparatus to, communicate with the management server to acquire an instruction from the management server in a case where the state of the client apparatus temporarily transitions from the sleep state to the normal state without the client apparatus receiving a user operation;

perform control so that after the communication is performed when the client apparatus is temporarily in the normal state, the state of the client apparatus transitions from the normal state to the sleep state.

12. The client apparatus according to claim 11, wherein, in a case where the client apparatus temporarily transitions to the normal state, and when the client apparatus transmits, to the management server, a request to acquire an instruction to the client apparatus, communication according to a second communication method different from the first communication method is performed.

13. A method for a client apparatus that transitions from a normal state to a sleep state when the client apparatus does not receive a user operation for a certain time period, the method comprising:

performing control so that, in a case where the state of the client apparatus is the normal state, communication with a management server for managing an instruction to the client apparatus is started according to a first communication method allowing the client apparatus to receive an instruction from the management server without a request from the client apparatus; and in a case where the client apparatus receives an instruction from the management server through the communication according to the first communication method when the state of the client apparatus transitions from the sleep state to the normal state by receiving a user operation, executing processing corresponding to the received user operation before execution of processing that is based on the received instruction and is expected to hinder the processing corresponding to the received user operation.

14. A non-transitory computer readable storage medium on which is stored a computer program for making a computer execute a method for a client apparatus that transitions from a normal state to a sleep state when the client apparatus does not receive a user operation for a certain time period, the method comprising:

performing control so that, in a case where the state of the client apparatus is the normal state, communication with a management server for managing an instruction to the client apparatus is started according to a first communication method allowing the client apparatus to receive an instruction from the management server without a request from the client apparatus; and in a case where the client apparatus receives an instruction from the management server through the communication according to the first communication method when the state of the client apparatus transitions from the sleep state to the normal state by receiving a user operation, executing processing corresponding to the received user operation before execution of processing that is based on the received instruction and is expected to hinder the processing corresponding to the received user operation.

* * * * *